(12) United States Patent
Bittner et al.

(10) Patent No.: US 9,720,971 B2
(45) Date of Patent: Aug. 1, 2017

(54) DISCOVERING TRANSFORMATIONS APPLIED TO A SOURCE TABLE TO GENERATE A TARGET TABLE

(75) Inventors: Torsten Bittner, San Jose, CA (US); Holger Kache, San Jose, CA (US); Mary Ann Roth, San Jose, CA (US); Yannick Saillet, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 1670 days.

(21) Appl. No.: 12/165,549

(22) Filed: Jun. 30, 2008

(65) Prior Publication Data
US 2009/0327208 A1 Dec. 31, 2009

(51) Int. Cl.
*G06F 17/30* (2006.01)
(52) U.S. Cl.
CPC .............................. *G06F 17/30507* (2013.01)
(58) Field of Classification Search
None
See application file for complete search history.

(56) References Cited

U.S. PATENT DOCUMENTS

| | | | |
|---|---|---|---|
| 5,594,900 A * | 1/1997 | Cohn | G06F 11/2064 |
| 5,615,341 A | 3/1997 | Agrawal et al. | |
| 5,675,785 A | 10/1997 | Hall et al. | |
| 5,692,107 A | 11/1997 | Simoudis et al. | |

(Continued)

FOREIGN PATENT DOCUMENTS

| | | |
|---|---|---|
| CN | 1435781 A | 8/2003 |
| CN | 1145901 C | 4/2004 |

(Continued)

OTHER PUBLICATIONS

Ronald Fagin, Phokion G. Kolaitis, and Lucian Popa "Composing Schema Mappings: Second-Order Dependencies to the Rescue", Dec. 2005, ACM Transactions on Database Systems, vol. 30, No. 4, pp. 994-1055.*

(Continued)

*Primary Examiner* — Polina Peach
(74) *Attorney, Agent, or Firm* — David W. Victor; Konrad, Raynes, Davda & Victor LLP

(57) ABSTRACT

Provided are a method, system, and article of manufacture for discovering transformations applied to a source table to generate a target table. Selection is made of a source table comprising a plurality of rows and a target table resulting from a transformation applied to the rows of the source table. A first pre-processing method is applied with respect to columns in the source and target tables to produce first category pre-processing output. The first category pre-processing output is used to determine first category transformation rules with respect to at least one source table column and at least one target table column. For each unpredicted target column in the target table not predicted by the determined first category transformation rules, a second pre-processing method is applied to columns in the source table and unpredicted target columns to produce second category pre-processing output. The second category pre-processing output is used to determine second category transformation rules with respect to at least one source table column and at least one target table column.

28 Claims, 18 Drawing Sheets

---

Pivot

Each group of association rules of type:
$R_i$: [ TargetColumnValue col="pivotCol" val="pivotVal$_i$"/>] ➔[ <ColumnEquality src="SCol$_i$" tgt="pivotedCol"/>]
(confidence($R_i$), support($R_i$))
(where pivotCol and pivotedCol are constant within the group)

is equivalent to the transformation:
$T_i$: pivotCol, pivotedCol are the result of a pivot of SCol$_1$, SCol$_2$, ..., SCol$_j$ Where:
$$pivotCol = \begin{cases} SCol_1 \text{ if } pivotedCol = pivotVal_1 \\ SCol_2 \text{ if } pivotedCol = pivotVal_2 \\ ... \\ SCol_i \text{ if } pivotedCol = pivotVal_i \end{cases} \quad confidence(T_i) = \frac{\sum support(R_i) * confidence(R_i)}{\sum support(R_i)}$$

(56) References Cited

U.S. PATENT DOCUMENTS

| | | | |
|---|---|---|---|
| 5,794,209 A | 8/1998 | Agrawal et al. | |
| 5,806,066 A | 9/1998 | Golshani et al. | |
| 5,809,297 A | 9/1998 | Kroenke et al. | |
| 5,813,002 A | 9/1998 | Agrawal et al. | |
| 5,943,667 A * | 8/1999 | Aggarwal | G06F 17/30539 |
| 5,978,796 A | 11/1999 | Malloy et al. | |
| 6,026,392 A | 2/2000 | Kouchi et al. | |
| 6,049,797 A | 4/2000 | Guha et al. | |
| 6,078,918 A | 6/2000 | Allen et al. | |
| 6,092,064 A | 7/2000 | Aggarwal et al. | |
| 6,112,198 A | 8/2000 | Lohman et al. | |
| 6,182,070 B1 | 1/2001 | Megiddo et al. | |
| 6,185,549 B1 | 2/2001 | Rastogi et al. | |
| 6,226,649 B1 | 5/2001 | Bodamer et al. | |
| 6,272,478 B1 | 8/2001 | Obata et al. | |
| 6,278,997 B1 | 8/2001 | Agrawal et al. | |
| 6,298,342 B1 | 10/2001 | Graefe et al. | |
| 6,301,575 B1 | 10/2001 | Chadha et al. | |
| 6,311,173 B1 | 10/2001 | Levin et al. | |
| 6,311,179 B1 | 10/2001 | Agarwal et al. | |
| 6,317,735 B1 | 11/2001 | Morimoto | |
| 6,339,775 B1 * | 1/2002 | Zamanian | G06F 17/30563 |
| 6,393,424 B1 | 5/2002 | Hallman et al. | |
| 6,542,881 B1 | 4/2003 | Meidan et al. | |
| 6,594,653 B2 | 7/2003 | Colby et al. | |
| 6,604,095 B1 * | 8/2003 | Cesare | G06F 17/30595 |
| 6,609,123 B1 * | 8/2003 | Cazemier et al. | |
| 6,836,773 B2 | 12/2004 | Tamayo et al. | |
| 6,850,947 B1 | 2/2005 | Chung et al. | |
| 6,877,012 B2 | 4/2005 | Ashida et al. | |
| 6,941,303 B2 | 9/2005 | Perrizo | |
| 6,954,756 B2 | 10/2005 | Arning et al. | |
| 6,965,888 B1 | 11/2005 | Cesare et al. | |
| 6,973,459 B1 * | 12/2005 | Yarmus | 707/778 |
| 7,007,020 B1 | 2/2006 | Chen et al. | |
| 7,028,288 B2 | 4/2006 | Wall et al. | |
| 7,065,517 B1 | 6/2006 | Austin | |
| 7,194,465 B1 * | 3/2007 | MacGregor | G06F 17/30536 |
| 7,249,118 B2 * | 7/2007 | Sandler et al. | |
| 7,266,537 B2 | 9/2007 | Jacobsen et al. | |
| 7,269,786 B1 * | 9/2007 | Malloy | G06F 17/246 |
| | | | 707/999.001 |
| 7,426,520 B2 | 9/2008 | Gorelik et al. | |
| 7,480,640 B1 * | 1/2009 | Elad | G06Q 10/10 |
| | | | 706/14 |
| 7,490,106 B2 | 2/2009 | Dumitru et al. | |
| 7,644,361 B2 * | 1/2010 | Wu et al. | 715/273 |
| 7,680,828 B2 | 3/2010 | Gorelik | |
| 7,702,694 B1 | 4/2010 | Perkins et al. | |
| 7,739,284 B2 * | 6/2010 | Aggarwal | G06F 17/30516 |
| | | | 707/737 |
| 7,836,004 B2 | 11/2010 | Roth et al. | |
| 8,166,000 B2 | 4/2012 | Labrie et al. | |
| 8,171,001 B2 | 5/2012 | Roth et al. | |
| 8,874,613 B2 | 10/2014 | Gorelik et al. | |
| 2002/0049685 A1 * | 4/2002 | Yaginuma | G06N 3/02 |
| | | | 706/21 |
| 2002/0091707 A1 * | 7/2002 | Keller | G06F 17/3061 |
| 2002/0127529 A1 * | 9/2002 | Cassuto | G09B 5/02 |
| | | | 434/335 |
| 2002/0178170 A1 | 11/2002 | Britton et al. | |
| 2003/0115280 A1 | 6/2003 | Quine et al. | |
| 2003/0126056 A1 | 7/2003 | Hausman et al. | |
| 2003/0158850 A1 | 8/2003 | Lawrence et al. | |
| 2003/0191667 A1 | 10/2003 | Fitzgerald et al. | |
| 2003/0212678 A1 * | 11/2003 | Bloom et al. | 707/6 |
| 2003/0217033 A1 * | 11/2003 | Sandler | G06F 17/30333 |
| 2003/0217069 A1 * | 11/2003 | Fagin et al. | 707/102 |
| 2004/0015783 A1 * | 1/2004 | Lennon et al. | 715/523 |
| 2004/0093344 A1 * | 5/2004 | Berger et al. | 707/102 |
| 2004/0093559 A1 | 5/2004 | Amaru et al. | |
| 2004/0189708 A1 | 9/2004 | Larcheveque et al. | |
| 2004/0226002 A1 | 11/2004 | Larcheveque et al. | |
| 2005/0055369 A1 * | 3/2005 | Gorelik et al. | 707/102 |
| 2005/0060313 A1 | 3/2005 | Naimat et al. | |
| 2005/0060647 A1 * | 3/2005 | Doan | G06F 17/30557 |
| | | | 715/205 |
| 2005/0066240 A1 | 3/2005 | Sykes et al. | |
| 2005/0066263 A1 | 3/2005 | Baugher | |
| 2005/0086250 A1 | 4/2005 | Richardson | |
| 2005/0097118 A1 * | 5/2005 | Slutz | G06F 11/3672 |
| 2005/0108631 A1 | 5/2005 | Amorin et al. | |
| 2005/0144552 A1 | 6/2005 | Kalthoff et al. | |
| 2005/0182739 A1 | 8/2005 | Dasu et al. | |
| 2005/0234688 A1 * | 10/2005 | Pinto et al. | 703/6 |
| 2005/0256892 A1 * | 11/2005 | Harken | 707/101 |
| 2005/0278308 A1 | 12/2005 | Barstow | |
| 2006/0004740 A1 | 1/2006 | Dettinger et al. | |
| 2006/0004750 A1 | 1/2006 | Huang et al. | |
| 2006/0053382 A1 * | 3/2006 | Gardner | G06F 3/0482 |
| | | | 715/764 |
| 2006/0106847 A1 | 5/2006 | Eckardt, III et al. | |
| 2006/0136461 A1 | 6/2006 | Lee et al. | |
| 2006/0136462 A1 * | 6/2006 | Campos | G06F 17/30539 |
| 2006/0161546 A1 | 7/2006 | Callaghan et al. | |
| 2006/0167579 A1 | 7/2006 | Fujii et al. | |
| 2006/0253435 A1 | 11/2006 | Nishizawa et al. | |
| 2006/0271528 A1 | 11/2006 | Gorelik | |
| 2006/0274760 A1 | 12/2006 | Loher | |
| 2007/0073688 A1 | 3/2007 | Fry | |
| 2007/0106785 A1 * | 5/2007 | Tandon | G06N 5/025 |
| | | | 709/224 |
| 2007/0156790 A1 | 7/2007 | Sun Hsu et al. | |
| 2007/0179959 A1 * | 8/2007 | Sharma | G06N 5/003 |
| 2007/0239769 A1 * | 10/2007 | Fazal et al. | 707/102 |
| 2007/0294221 A1 * | 12/2007 | Chen | G06F 17/30489 |
| 2008/0005063 A1 * | 1/2008 | Seeds | G06F 17/30592 |
| 2008/0005183 A1 | 1/2008 | Bostick et al. | |
| 2008/0027899 A1 | 1/2008 | Khunteta et al. | |
| 2008/0085742 A1 | 4/2008 | Karukka et al. | |
| 2008/0140602 A1 | 6/2008 | Roth et al. | |
| 2008/0243823 A1 * | 10/2008 | Baris et al. | 707/5 |
| 2009/0024551 A1 | 1/2009 | Agrawal et al. | |
| 2009/0094274 A1 | 4/2009 | Gorelik et al. | |
| 2009/0204631 A1 | 8/2009 | Pomroy et al. | |
| 2009/0281974 A1 | 11/2009 | Saxena et al. | |
| 2009/0327208 A1 | 12/2009 | Bittner et al. | |
| 2011/0246503 A1 | 10/2011 | Bender et al. | |
| 2012/0078913 A1 | 3/2012 | Muni et al. | |
| 2012/0158745 A1 | 6/2012 | Gorelik et al. | |
| 2013/0254183 A1 | 9/2013 | Gorelik et al. | |
| 2015/0074117 A1 | 3/2015 | Gorelik et al. | |

FOREIGN PATENT DOCUMENTS

| | | |
|---|---|---|
| WO | 0137135 A2 | 5/2001 |
| WO | 0175679 A1 | 10/2001 |
| WO | 02073468 A1 | 9/2002 |
| WO | 2005027019 | 3/2005 |

OTHER PUBLICATIONS

Chinese Office Action, Sep. 4, 2009, for Application No. CN2007101867790, 7 pp.

Jingyi, D., "Survey of Association Rule Data Mining", © 1994-2009 China Academic Journal Electronic Publishing House, Total 2 pp [with English Abstract on p. 1].

English Abstract for CN1435781A, published Aug. 13, 2003, 1 p.

English Abstract for CN1145901C, published Apr. 14, 2004, 1 p.

Nesvizhskii, A.I., F.F. Roos, J. Grossmann, M. Vogelzang, J.S. Eddes, W. Gruissem, S. Baginsky, and R. Aebersold, "Dynamic Spectrum Quality Assessment and Iterative Computational Analysis of Shotgun Proteomic Data", Molecular & Cellular Proteomics, vol. 5, © 2006, The American Society for Biochemistry and Molecular Biology, Inc., pp. 652-670.

Data Mining Group, "Association Rules" [online], [Retrieved on Nov. 1, 2006]. Retrieved from the Internet at <URL: http://www.dmg.org/v3-1/AssociationRules.html>, 7 pp.

Data Mining Group, "Trees" [online], [Retrieved on Nov. 1, 2006]. Retrieved from the Internet at <URL: http://www.dmg.org/v3-1/TreeModel.html>, 18 pp.

(56) References Cited

OTHER PUBLICATIONS

Han, E.H., G. Karypis, and V. Kumar, "Scalable Parallel Data Mining for Association Rules", 1997 ACM, Proceedings of the 1997 ACM SIGMOD International Conference on Management of Data, pp. 277-288.
Hipp, J., U. Guntzer, & U. Grimmer, "Data Quality Mining—Making a Virtue of Necessity", Proceedings of the 6th ACM SIGMOD Workshop on Research Issues in Data Mining and Knowledge Discovery, 2001, pp. 52-57.
Janta-Polczynski, M. and E. Roventa, "Fuzzy Measures for Data Quality", 18th International Conference of the North American Fuzzy Information Processing Society, Jul. 1999, pp. 398-402.
Knobbe, A.J., "Multi-Relational Data Mining", Nov. 22, 2004, 130 pp.
Korn, F., A. Labrinidis, Y. Kotidis, & C. Faloutsos, "Quantifiable Data Mining Using Ratio Rules", The VLDB Journal, 2000, pp. 254-266.
Marchetti, C., M. Mecella, M. Scannapieco, and A. Virgillito, "Enabling Data Quality Notification in Cooperative Information Systems through a Web-Service Based Architecture", Proceedings of the Fourth International Conference on Web Information Systems Engineering, 2003, 4 pp.
Marcus, A., J.I. Maletic, & K. Lin, "Ordinal Association Rules for Error Identification in Data Sets", Proceedings of the Tenth International Conference on Information and Knowledge Management, 2001, pp. 589-591.
Morgan, S.A. and T.G. Reish, "Implementation of Comprehensive Qualification and Validation of Entry Fields", Disclosure AT8940402, TDB, v38, n2, Feb. 1995, pp. 317-318.
Muller, H., U. Leser, & J. Freytag, "Mining for Patterns in Contradictory Data", Proceedings of the 2004 International Workshop on Information Quality in Information Systems, 2004, pp. 51-58.
Pudi, V., "Data Mining—Association Rules", [online], [retrieved on Nov. 1, 2006], retrieved from the Internet at <URL: http://www.iiit.ac.in/~vikram/mining.html>, 3 pp.
Seekamp, C. and K. Britton, "Dynamic Generation of Rules from Properties to Improve Rule Processing Performance", Disclosure RSW819990242, RD, n429, Article 134, Jan. 2000, p. 172.
Shekhar, S., B. Hamidzadeh, A. Kohli, & M. Coyle, "Learning Transformation Rules for Semantic Query Optimization: A Data-Driven Approach", IEEE Transactions on Knowledge and Data Engineering, vol. 5, Iss. 6, Dec. 1993, pp. 950-964.
Shipway, R.E. and P.M. Tricker, "Data Validation and Correction by Context", Disclosure RO8700150, TDB, Sep. 1971, pp. 1132-1137.
U.S. Appl. No. 11/779,251, filed Jul. 17, 2007, entitled "Managing Validation Models and Rules to Apply to Data Sets", invented by Labrie, J.J., G. Agrawal, M.A. Roth, & Y. Saillet, 34 pp.
U.S. Appl. No. 11/769,639, filed Jun. 27, 2007, entitled "Using a Data Mining Algorithm to Generate Format Rules Used to Validate Data Sets", invented by J.J. Labrie, D. Meeks, M.A. Roth, and Y. Saillet.
U.S. Appl. No. 11/769,634, filed Jun. 27, 2007, entitled "Using a Data Mining Algorithm to Generate Rules Used to Validate a Selected Region of a Predicted Column", invented by M.A. Roth and Y. Saillet.
Wang, R.Y., H.B. Kon, and S.E. Madnick, "Data Quality Requirements Analysis and Modeling", Proceedings of the Ninth International Conference on Data Engineering, 1999, pp. 670-677.
Wikipedia, "Apriori Algorithm", [online], Updated May 22, 2006, [retrieved on Jun. 20, 2008], retrieved from the Internet at <URL: http://en.wikipedia.org/w/index.php?title=apriori_algorithm&printable=yes>, 3 pp.
Wikipedia, "Decision Tree", [online], [retrieved on Nov. 1, 2006], retrieved from the Internet at <URL: http://en.wikipedia.org/w/index.php?title=Decision_tree&printable=yes>, 7 pp.
Wikipedia, "N-gram", [online], updated Apr. 10, 2007, [Retrieved on May 13, 2007], retrieved from the Internet at <URL: http://en.wikipedia.org/w/index.php?title=N-gram&printable=yes>, 3 pp.
Williams, J., "Tools for Traveling Data", [online], Jun. 1997, [retrieved on Mar. 25, 2008], retrieved from the Internet at <URL: http://www.dbmsmag.com/9706d16.html>, 10 pp.
Amendment 1, Aug. 6, 2009, for U.S. Appl. No. 11/609,307, Total 16 pp.
Amendment 2, Mar. 10, 2010, for U.S. Appl. No. 11/609,307, Total 11 pp.
Final Office Action 1, Dec. 10, 2009, for U.S. Appl. No. 11/609,307, Total 10 pp.
Notice of Allowance 1, Apr. 19, 2010, for U.S. Appl. No. 11/609,307, Total 11 pp.
Notice of Allowance 2, Jun. 28, 2010, for U.S. Appl. No. 11/609,307, Total 9 pp.
Office Action 1, Apr. 6, 2009, for U.S. Appl. No. 11/609,307, Total 26 pp.
Office Action 1, Apr. 5, 2010, for U.S. Appl. No. 11/779,251, Total 29 pp.
Final Office Action 1, Oct. 1, 2010, for U.S. Appl. No. 11/779,251, Total 23 pp.
Amendment 1, Jul. 6, 2010, for U.S. Appl. No. 11/779,251, Total 16 pp.
Amendment 2, Dec. 28, 2010, for U.S. Appl. No. 11/779,251, Total 18 pp.
Office Action 1, Apr. 7, 2011, for U.S. Appl. No. 11/769,634, Total 40 pp.
Office Action 1, Apr. 14, 2011, for U.S. Appl. No. 11/769,639, Total 36 pp.
Notice of Allowance, Oct. 27, 2009, for U.S. Appl. No. 11/499,442, filed Aug. 4, 2006 by A. Gorelik et al., Total 27 pp.
Office Action 1, Sep. 11, 2007, for U.S. Appl. No. 10/938,205, filed Sep. 9, 2004 by A. Gorelik et al., Total 19 pp.
Office Action 1, Aug. 29, 2012, for U.S. Appl. No. 13/267,292, filed Oct. 6, 2011 by A. Gorelik et al., Total 23 pp.
Office Action 1, Mar. 5, 2009, for U.S. Appl. No. 11/499,442, filed Aug. 4, 2006 by A. Gorelik et al., Total 22 pp.
Preliminary Amendment, Oct. 6, 2011, for U.S. Appl. No. 13/267,292, filed Oct. 6, 2011 by A. Gorelik et al., Total 8 pp.
Restriction Requirement, Jul. 9, 2012, for U.S. Appl. No. 13/267,292, filed Oct. 6, 2011 by A. Gorelik et al., Total 8 pp.
Response to Restriction Requirement, Aug. 9, 2012, for U.S. Appl. No. 13/267,292, filed Oct. 6, 2011 by A. Gorelik et al., Total 1 p.
Informatica, The Data Integration Company, "Enterprise Data Integration—Maximizing the Business Value of your Enterprise Data", Feb. 24, 2006, Total 9 pp.
"Principles of Object Oriented Programming", Total 7 pp.
Saracco, C.M., J. Labrie, and S. Brodsky, [online]. Retrieved from the Internet at <URL: http://www.ibm.com/developerworks/data/library/techarticle/dm-0407saracco/>, "Using Service Data Objects with Enterprise Information Integration Technology", IBM, Jul. 1, 2004, pp. 1-14. [Also Total 14 pp].
Baldwin, R.T., "Views, Objects, and Persistence for Accessing a High Volume Global Data Set", National Climatic Data Center, © 2003, Total 5 pp.
"Procedure Oriented Programming (POP) vs Object Oriented Programming (OOP)", [online], [Retrieved on Oct. 10, 2012]. Retrieved from the Internet at <URL: http://hacksnpasses.blogspot.com/2011/05/procedure-oriented-programmingpop-vs.html>, Thursday, May 26, 2011, Total 8 pp.
Kach, H., Y. Saillet, and M. Roth, "Transformation Rule Discovery through Data Mining", 2008 ACM, VLDB '08, Aug. 24-30, 2008, VLDB Endowment, Total 4 pp.
Notice of Allowance 2, Dec. 14, 2011, for U.S. Appl. No. 11/769,639, filed Jun. 27, 2007 by J.J. Labrie et al., Total 15 pp.
Notice of Allowance 2, Dec. 28, 2011, for U.S. Appl. No. 11/769,634, filed Jun. 27, 2007 by M.A. Roth et al., Total 15 pp.
U.S. Appl. No. 13/435,352, filed Mar. 30, 2012, entitled "Discovering Pivot Type Relationships Between Database Objects", invented by Burda, L., S. Datta, A. Gorelik, D. Ren, and L.M. Tsentsiper, Total 48 pp.
Notice of Allowance 3, Nov. 9, 2012, for U.S. Appl. No. 11/779,251, filed Jul. 17, 2007 by G. Agrawal et al., Total 24 pp.
Amendment 1, Nov. 29, 2012, for U.S. Appl. No. 13/267,292, filed Oct. 6, 2011 by A. Gorelik et al., Total 6 pp.

(56) References Cited

OTHER PUBLICATIONS

Amendment 1, Jul. 7, 2011, for U.S. Appl. No. 11/769,634, filed Jun. 27, 2007 by M.A. Roth et al., Total 17 pp.
Amendment 1, Jul. 14, 2011, for U.S. Appl. No. 11/769,639, filed Jun. 27, 2007 by J.J. Labrie et al., Total 16 pp.
Notice of Allowance 1, Aug. 29, 2011, for U.S. Appl. No. 11/779,251, filed Jul. 17, 2007 by J.J. Labrie et al., Total 18 pp.
Peim, M., E. Franconi, and N.W. Paton, "Estimating the Quality of Answers when Querying over Description Logic Ontologies", Data & Knowledge Engineering, © 2003, Total 25 pp.
Notice of Allowance 1, Sep. 22, 2011, for U.S. Appl. No. 11/769,639, filed Jun. 27, 2007 by J.J. Labrie et al., Total 19 pp.
Notice of Allowance 2, Dec. 14, 2011, for U.S. Appl. No. 11/769,639, filed Jun. 27, 2007 by J.J. Labrie et al., Total 15 pp.
Notice of Allowance 1, Sep. 20, 2011, for U.S. Appl. No. 11/769,634, filed Jun. 27, 2007 by M.A. Roth et al., Total 19 pp.
Amendment 1, Jan. 11, 2008, for U.S. Appl. No. 10/938,205, filed Sep. 9, 2004 by Gorelik et al., Total 34 pp.
Amendment 1, Jul. 6, 2009, for U.S. Appl. No. 11/499,442, filed Aug. 4, 2006 by Gorelik, A., Total 27 pp.
Amendment 1, Jul. 26, 2011, for U.S. Appl. No. 12/283,477, filed Sep. 12, 2008 by Gorelik et al., Total 21 pp.
Amendment 2, Nov. 9, 2011, for U.S. Appl. No. 12/283,477, filed Sep. 12, 2008 by Gorelik et al., Total 4 pp.
Notice of Allowance, May 1, 2008, for U.S. Appl. No. 10/938,205, filed Sep. 9, 2004 by Gorelik et al., Total 18 pp.
Notice of Allowance, Aug. 10, 2011, for U.S. Appl. No. 12/283,477, filed Sep. 12, 2008 by Gorelik et al., Total 14 pp.
Office Action 1, Apr. 26, 2011, for U.S. Appl. No. 12/283,477, filed Sep. 12, 2008 by Gorelik et al., Total 24 pp.
International Preliminary Report, Mar. 13, 2006, for PCT/US2004/029631, Total 4 pp.
Written Opinion, Mar. 10, 2006, for PCT/US04/29631, Total 3 pp.
International Search Report, Mar. 23, 2006, for PCT/US2004/029631, Total 3 pp.
Preliminary Amendment, Dec. 9, 2009, for U.S. Appl. No. 12/283,477, filed Sep. 12, 2008 by Gorelik et al., Total 8 pp.
Response to Restriction Requirement, Apr. 19, 2011, for U.S. Appl. No. 12/283,477, filed Sep. 12, 2008 by Gorelik et al., Total 1 p.
Restriction Requirement, Jun. 18, 2007, for U.S. Appl. No. 10/938,205, filed Sep. 9, 2004 by Gorelik et al., Total 7 pp.
Restriction Requirement, Mar. 23, 2011, for U.S. Appl. No. 12/283,477, filed Sep. 12, 2008 by Gorelik et al., Total 10 pp.
Response to Restriction Requirement, Aug. 17, 2007, for U.S. Appl. No. 10/938,205, filed Sep. 9, 2004 by Gorelik et al., Total 4 pp.
Restriction Requirement 2, Feb. 13, 2008, for U.S. Appl. No. 10/938,205, filed Sep. 9, 2004 by Gorelik et al., Total 7 pp.
Response to Restriction Requirement 2, Mar. 12, 2008, for U.S. Appl. No. 10/938,205, filed Sep. 9, 2004 by Gorelik et al., Total 4 pp.
Notice of Allowance 2, Apr. 26, 2012, for U.S. Appl. No. 11/779,251, filed Jul. 17, 2007 by G. Agrawal et al., Total 15 pp.
Notice of Allowance 1, Jan. 2, 2013, for U.S. Appl. No. 13/267,292, filed Oct. 6, 2011 by A. Gorelik et al., Total 38 pp.
Office Action 1, Jun. 3, 2013, for U.S. Appl. No. 13/435,352, filed Mar. 30, 2012 by L. Burda et al., Total 39 pp.
Response to Office Action1 for U.S. Appl. No. 13/435,352, filed Sep. 3, 2013, 10 pp.
U.S. Appl. No. 14/507,805, filed Oct. 6, 2014, entitled "Semantic Discovery and Mapping Between Data Sources", invented by A. Gorelik et al., Total 80 pp.
Final Office Action, Oct. 31, 2013, for U.S. Appl. No. 13/435,352, filed Mar. 30, 2012 by L. Burda et al., Total 17 pp.
Office Action 3, Apr. 15, 2014, for U.S. Appl. No. 13/435,352, filed Mar. 30, 2012 by L. Burda et al., Total 19.
Response to Office Action 3, Jul. 15, 2014, for U.S. Appl. No. 13/435,352, filed Mar. 30, 2012 by L. Burda et al., Total 12 pp.
Notice of Allowance, Aug. 29, 2014, for U.S. Appl. No. 13/435,352, filed Mar. 30, 2012 by L. Burda et al., Total 40 pp.
Restriction Requirement for U.S. Appl. No. 13/891,130, dated Oct. 16, 2013, 7 pp.
Response to Restriction Requirement for U.S. Appl. No. 13/891,130, dated Nov. 18, 2013, 3 pp.
Office Action 1 for U.S. Appl. No. 13/891,130, dated Dec. 13, 2013, 44 pp.
Amendment 1, Mar. 13, 2014, for U.S. Appl. No. 13/891,130, filed May 9, 2013 by A. Gorelik et al., Total 7 pp.
Notice of Allowance, Jun. 18, 2014 for U.S. Appl. No. 13/891,130, filed May 9, 2013 by A. Gorelik et al., Total 12 pp.
Restriction Requirement, May 22, 2015, for U.S. Appl. No. 14/507,805, filed Oct. 6, 2014 by A. Gorelik et al., Total 7 pp.
Response to Restriction Requirement, Jul. 22, 2015, for U.S. Appl. No. 14/507,805, filed Oct. 6, 2014 by A. Gorelik et al., Total 4 pp.
Office Action 1, Aug. 6, 2015, for U.S. Appl. No. 14/507,805, filed Oct. 6, 2014 by A. Gorelik et al., Total 36 pp.
Response to Office Action 1, Dec. 7, 2015, for U.S. Appl. No. 14/507,805, filed Oct. 6, 2014 by A. Gorelik et al., Total 11 pp.
Notice of Allowance, Dec. 30, 2015, for U.S. Appl. No. 14/507,805, filed Oct. 6, 2014 by A. Gorelik et al., Total 35 pp.

* cited by examiner

FIG. 1d: Reverse Pivot

*Prior Art* src

| ID | geo | sale |
|---|---|---|
| 1 | America | 15 |
| 1 | EMEA | 13 |
| 1 | AP | 9 |
| 2 | America | 23 |
| 2 | EMEA | 17 |
| 2 | AP | 12 |
| ... | ... | ... | tgt

| ID | amer | emea | ap |
|---|---|---|---|
| 1 | 15 | 13 | 9 |
| 2 | 23 | 17 | 12 |
| ... | ... | ... | ... |

$\begin{cases} \text{tgt.amer=src.sale if src.geo=``America''} \\ \text{tgt.emea=src.sale if src.geo=``EMEA''} \\ \text{tgt.ap=src.sale if src.geo=``AP''} \end{cases}$

FIG. 1e: String Concatenation

Target.CA=CONCAT(Source.col2, Source.col1)

*Prior Art*

| ID | col1 | col2 |
|---|---|---|
| 1 | Smith | John |
| 2 | Johnson | Bill |
| 3 | Carter | Joe |

Source

| ID | CA |
|---|---|
| 1 | John Smith |
| 2 | Bill Johnson |
| 3 | Joe Carter |

Target

FIG. 1f: String Split

*Prior Art*

| ID | col1 |
|---|---|
| 1 | San Jose, CA 95141 |
| 2 | Yorktown, NY 10598 |
| 3 | Austin, TX 78758 |

Source

| ID | CA | CB | CC |
|---|---|---|---|
| 1 | San Jose | CA | 95141 |
| 2 | Yorktown | NY | 10598 |
| 3 | Austin | TX | 78758 |

Target

FIG. 1g: Substring
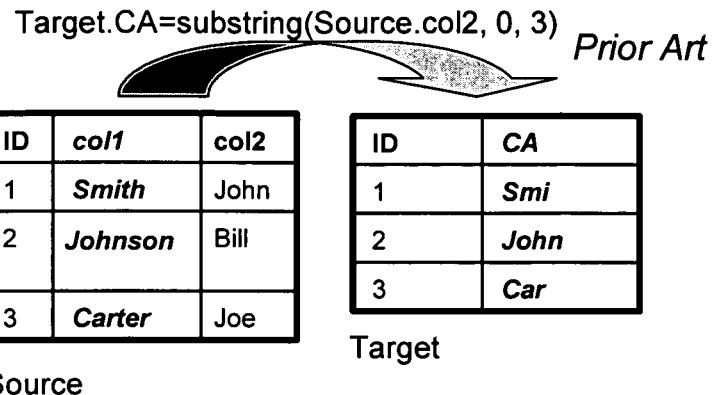
FIG. 1h: Scalar Function
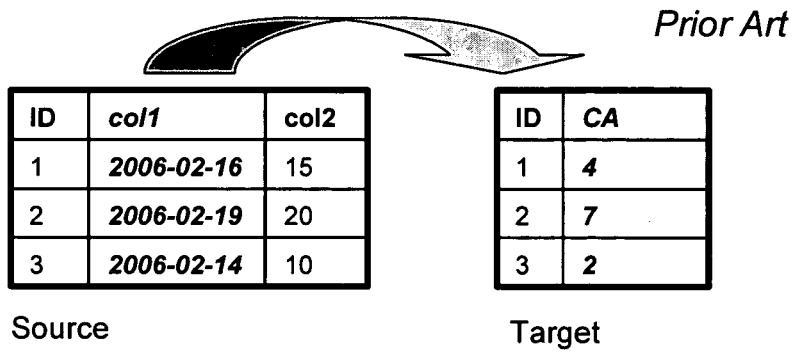
FIG. 1i: Aggregation
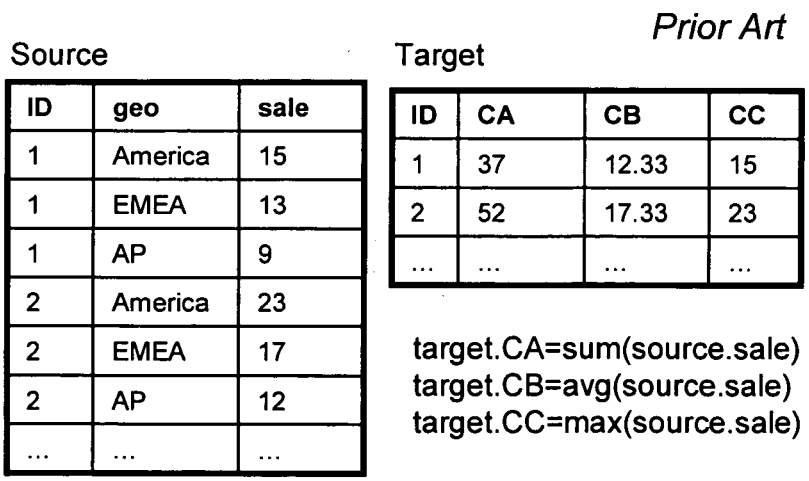

FIG. 1j: Arithmetic
Target.CA=Source.col1*Source.col2+10
Target.CB=5*Source.col3-Source.col2
*Prior Art*
Source
| ID | col1 | col2 | col3 |
|----|------|------|------|
| 1  | 3    | 105  | 22   |
| 2  | 5    | 73   | 15   |
| 3  | 2    | 122  | 23   |
| 4  | 1    | 54   | 10   |
Target
| ID | CA  | CB |
|----|-----|----|
| 1  | 325 | 5  |
| 2  | 375 | 2  |
| 3  | 254 | -7 |
| 4  | 64  | -4 |

FIG. 6

| ID | S_ACCOUNT_TYPE / T_TITLE | S_AVG_BAL / T_NAME | S_ADDRESS / T_BIRTHYEAR | S_ZIP / T_ACCOUNT_TYPE1 | S_MARITAL_STATUS / T_ACCOUNT_TYPE2 | S_NAME / T_DECADE | S_AGE / T_SAVINGSBAL | T_TOT_BAL | T_ADDRESS / T_CHECKINGBAL |
|---|---|---|---|---|---|---|---|---|---|
| 0 | SAVINGS / Ms | -41.04 / HENRY M PIRTLE JR | 6501 MCFARLAND... / 1975 | 35476 / SAVINGS | single | HENRY M PIRTLE JR / CHECKING | 32 / -41.04 | -152 | 6501 MCFARLAND...,35476 / -110.96 |
| 0 | CHECKING / Ms | -110.96 / HENRY M PIRTLE JR | 6501 MCFARLAND... / 1975 | 35476 / SAVINGS | single | HENRY M PIRTLE JR / CHECKING | 32 / -41.04 | -152 | 6501 MCFARLAND...,35476 / -110.96 |
| 1 | SAVINGS / Mrs | -103 / WILLIAM E MILLS | 1210 HILLSBORO... / 1969 | 33434-4448 / SAVINGS | married | WILLIAM E MILLS | 38 / -103 | -103 | 1210 HILLSBORO...,33431-4448 |
| 2 | SAVINGS / Mrs | -72 / MAGDALENE G DENDY | 14271 NW SCEINCE... / 1955 | 97229 / SAVINGS | married | MAGDALENE G DENDY / 50 | 52 / -72 | -72 | 14271 NW SCEINCE...,97229 |
| 3 | CHECKING / Mrs | -48.18 / KEENWAY FARMS | 1104 W OAK STREET... / 1935 | 34741-4177 / SAVINGS | married | KEENWAY FARMS / CHECKING / 70 | 72 / -17.82 | -66 | 1104 W OAK STREET...,34741-4177 / -48.18 |
| 3 | SAVINGS / Mrs | -17.82 / KEENWAY FARMS | 1104 W OAK STREET... / 1935 | 34741-4177 / SAVINGS | married | KEENWAY FARMS / CHECKING / 70 | 72 / -17.82 | -66 | 1104 W OAK STREET...,34741-4177 / -48.18 |
| 4 | SAVINGS / Miss | 0 / ROBERT G SHARPE | 1523 WILDE ROCK... / 1997 | 77018-7327 / SAVINGS | child | ROBERT G SHARPE / 10 | 10 / 0 | 0 | 1523 WILDE ROCK...,77018-7327 |
| 5 | SAVINGS / Miss | 0 / GEORGIA C BELL | 802 MERRIMAC ST... / 1995 | 32725-5728 / SAVINGS | child | GEORGIA C BELL / 10 | 12 / 0 | 0 | 802 MERRIMAC ST...,32725-5728 |
| 6 | SAVINGS / Miss | 0 / MAY WALKER UNDERWOOD | 1901 E 22ND ST... / 1995 | 72206-2548 / SAVINGS | child | MAY WALKER UNDERWOOD / CHECKING / 10 | 12 / 0 | 0 | 1901 E 22ND ST...,72206-2548 / 0 |
| 6 | CHECKING / Miss | 0 / MAY WALKER UNDERWOOD | 1901 E 22ND ST... / 1995 | 72206-2548 / SAVINGS | child | MAY WALKER UNDERWOOD / CHECKING / 10 | 12 / 0 | 0 | 1901 E 22ND ST...,72206-2548 / 0 |
| 7 | SAVINGS / Miss | 0 / OLLIE H KING | 7506 CAUSEWAY... / 1995 | 33619-5931 / SAVINGS | child | OLLIE H KING / 10 | 12 / 0 | 0 | 7506 CAUSEWAY...,33619-5931 |
| 8 | SAVINGS / Miss | 0 / GRADY WINDHAM | 224 PONTE VEDRA... / 1995 | 32082 / SAVINGS | child | GRADY WINDHAM / 10 | 12 / 0 | 0 | 224 PONTE VEDRA...,32082 |
| 9 | SAVINGS / Miss | 0 / LAWRENCE O WINDHAM | PO BOX 19... / 1995 | 30281-0019 / SAVINGS | child | LAWRENCE O WINDHAM / CHECKING / 10 | 12 / 0 | 0 | PO BOX 19...,30281-0019 / 0 |
| 9 | CHECKING / Miss | 0 / LAWRENCE O WINDHAM | PO BOX 19... / 1995 | 30281-0019 / SAVINGS | child | LAWRENCE O WINDHAM / CHECKING / 10 | 12 / 0 | 0 | PO BOX 19...,30281-0019 / 0 |

| ROWID | ITEM |
|---|---|
| | `<True/>` |
| 1 | `<SourceColumnValue col="S_ACCOUNT_TYPE" val="SAVINGS"/>` |
| 1 | `<SourceColumnValue col="S_ADDRESS" val="6501 MCFARLAND..."/>` |
| 1 | `<SourceColumnValue col="S_AGE" val="32"/>` |
| 1 | `<SourceColumnValue col="S_AVG_BAL" val="-41.04"/>` |
| 1 | `<SourceColumnValue col="S_MARITAL_STATUS" val="single"/>` |
| 1 | `<SourceColumnValue col="S_NAME" val="HENRY M PIRTLE JR"/>` |
| 1 | `<SourceColumnValue col="S_ZIP" val="35476"/>` |
| 1 | `<TargetColumnValue col="T_ACCOUNT_TYPE1" val="SAVINGS"/>` |
| 1 | `<TargetColumnValue col="T_ACCOUNT_TYPE2" val="CHECKING"/>` |
| 1 | `<TargetColumnValue col="T_ADDRESS" val="6501 MCFARLAND...,35476"/>` |
| 1 | `<TargetColumnValue col="T_BIRTHYEAR" val="1975"/>` |
| 1 | `<TargetColumnValue col="T_CHECKINGBAL" val="-110.96"/>` |
| 1 | `<TargetColumnValue col="T_DECADE" val="30"/>` |
| 1 | `<TargetColumnValue col="T_NAME" val="HENRY M PIRTLE JR"/>` |
| 1 | `<TargetColumnValue col="T_SAVINGSBAL" val="-41.04"/>` |
| 1 | `<TargetColumnValue col="T_TITLE" val="Ms"/>` |
| 1 | `<TargetColumnValue col="T_TOT_BAL" val="-152.00"/>` |
| 1 | `<ColumnEquality src="S_ACCOUNT_TYPE" tgt="T_ACCOUNT_TYPE1"/>` |
| 1 | `<ColumnEquality src="S_AVG_BAL" tgt="T_SAVINGSBAL"/>` |
| 1 | `<ColumnEquality src="S_NAME" tgt="T_NAME"/>` |
| 1 | `<TargetInSource src="S_ACCOUNT_TYPE" tgt="T_ACCOUNT_TYPE1"/>` |
| 1 | `<SourceInTarget src="S_ACCOUNT_TYPE" tgt="T_ACCOUNT_TYPE1"/>` |
| 1 | `<TargetInSource src="S_ADDRESS" tgt="T_ADDRESS"/>` |
| 1 | `<TargetInSource src="S_NAME" tgt="T_NAME"/>` |
| 1 | `<SourceInTarget src="S_NAME" tgt="T_NAME"/>` |
| 1 | `<SourceInTarget src="S_ZIP" tgt="T_ADDRESS"/>` |
| 2 | `<True/>` |
| 2 | `<SourceColumnValue col="S_ACCOUNT_TYPE" val="CHECKING"/>` |
| 2 | `<SourceColumnValue col="S_ADDRESS" val="6501 MCFARLAND..."/>` |
| 2 | `<SourceColumnValue col="S_AGE" val="32"/>` |
| 2 | `<SourceColumnValue col="S_AVG_BAL" val="-110.96"/>` |
| 2 | `<SourceColumnValue col="S_MARITAL_STATUS" val="single"/>` |
| 2 | `<SourceColumnValue col="S_NAME" val="HENRY M PIRTLE JR"/>` |
| 2 | `<SourceColumnValue col="S_ZIP" val="35476"/>` |
| 2 | `<TargetColumnValue col="T_ACCOUNT_TYPE1" val="SAVINGS"/>` |
| 2 | `<TargetColumnValue col="T_ACCOUNT_TYPE2" val="CHECKING"/>` |
| 2 | `<TargetColumnValue col="T_ADDRESS" val="6501 MCFARLAND...,35476"/>` |
| 2 | `<TargetColumnValue col="T_BIRTHYEAR" val="1975"/>` |
| 2 | `<TargetColumnValue col="T_CHECKINGBAL" val="-110.96"/>` |
| 2 | `<TargetColumnValue col="T_DECADE" val="30"/>` |
| 2 | `<TargetColumnValue col="T_NAME" val="HENRY M PIRTLE JR"/>` |
| 2 | ... |

FIG. 8

```
210  [<True/>]  → [<ColumnEquality src="S_NAME" tgt="T_NAME"/>]
     [<True/>]  → [<SourceInTarget src="S_NAME" tgt="T_NAME"/>]
212  [<True/>]  → [<TargetInSource src="S_NAME" tgt="T_NAME"/>]
     [<True/>]  → [<SourceInTarget src="S_ZIP" tgt="T_ADDRESS"/>]
214  [<True/>]  → [<SourceInTarget src="S_ADDRESS" tgt="T_ADDRESS"/>]
     [<ColumnEquality src="S_ACCOUNT_TYPE" tgt="T_ACCOUNT_TYPE1"/>]  → [<SourceColumnValue col="S_ACCOUNT_TYPE" val="SAVINGS"/>]
     [<ColumnEquality src="S_ACCOUNT_TYPE" tgt="T_ACCOUNT_TYPE1"/>]  → [<SourceInTarget src="S_ACCOUNT_TYPE" tgt="T_ACCOUNT_TYPE1"/>]
     [<ColumnEquality src="S_ACCOUNT_TYPE" tgt="T_ACCOUNT_TYPE1"/>]  → [<TargetInSource src="S_ACCOUNT_TYPE" tgt="T_ACCOUNT_TYPE1"/>]
     [<TargetColumnValue col="T_BIRTHYEAR" val="1967"/>]  → [<SourceColumnValue col="S_AGE" val="40"/>]
     [<TargetColumnValue col="T_BIRTHYEAR" val="1976"/>]  → [<SourceColumnValue col="S_AGE" val="31"/>]
     [<TargetColumnValue col="T_SAVINGSBAL" val="0.0"/>]  → [<SourceColumnValue col="S_AVG_BAL" val="0.0"/>]
     [<TargetColumnValue col="T_CHECKINGBAL" val="0.0"/>]  → [<ColumnEquality src="S_AVG_BAL" tgt="T_SAVINGSBAL"/>]
     [<TargetColumnValue col="T_ACCOUNT_TYPE2" val="NULL"/>]  → [<ColumnEquality src="S_AVG_BAL" tgt="T_SAVINGSBAL"/>]
     [<TargetColumnValue col="T_CHECKINGBAL" val="0.0"/>]  → [<ColumnEquality src="S_AVG_BAL" tgt="T_SAVINGSBAL"/>]
     [<TargetColumnValue col="T_SAVINGSBAL" val="0.0"/>]  → [<ColumnEquality src="S_AVG_BAL" tgt="T_SAVINGSBAL"/>]
     [<SourceInSource src="S_ACCOUNT_TYPE" tgt="T_ACCOUNT_TYPE1"/>]  → [<ColumnEquality src="S_NAME" tgt="T_NAME"/>]
     [<SourceColumnValue col="S_MARITAL_STATUS" val="married"/>]  → [<ColumnEquality src="S_NAME" tgt="T_NAME"/>]
     [<SourceColumnValue col="S_MARITAL_STATUS" val="married"/>]  → [<TargetColumnValue col="T_TITLE" val="Mrs"/>]
     [<SourceColumnValue col="S_MARITAL_STATUS" val="widowed"/>]  → [<TargetColumnValue col="T_TITLE" val="Mrs"/>]
     [<SourceColumnValue col="S_MARITAL_STATUS" val="single"/>]  → [<TargetColumnValue col="T_TITLE" val="Ms"/>]
     [<SourceColumnValue col="S_MARITAL_STATUS" val="divorced"/>]  → [<TargetColumnValue col="T_TITLE" val="Ms"/>]
     [<SourceColumnValue col="S_MARITAL_STATUS" val="cohabitant"/>]  → [<TargetColumnValue col="T_TITLE" val="Ms"/>]
     [<SourceColumnValue col="S_ACCOUNT_TYPE" val="CHECKING"/>]  → [<ColumnEquality src="S_AVG_BAL" tgt="T_CHECKINGBAL"/>]
     [<SourceColumnValue col="S_ACCOUNT_TYPE" val="SAVINGS"/>]  → [<ColumnEquality src="S_AVG_BAL" tgt="T_SAVINGSBAL"/>]
     [<SourceColumnValue col="S_ACCOUNT_TYPE" val="SAVINGS"/>]  → [<ColumnEquality src="S_AVG_BAL" tgt="T_SAVINGSBAL"/>]
     [<SourceColumnValue col="S_ACCOUNT_TYPE" val="SAVINGS"/>]  → [<ColumnEquality src="S_AVG_BAL" tgt="T_SAVINGSBAL"/>]
     [<SourceColumnValue col="S_ACCOUNT_TYPE" val="SAVINGS"/>]  → [<SourceInTarget src="S_ACCOUNT_TYPE" tgt="T_ACCOUNT_TYPE1"/>]
     [<SourceColumnValue col="S_ACCOUNT_TYPE" val="SAVINGS"/>]  → [<SourceInTarget src="S_ACCOUNT_TYPE" tgt="T_ACCOUNT_TYPE1"/>]
     [<SourceColumnValue col="S_ACCOUNT_TYPE" val="SAVINGS"/>]  → [<TargetInSource src="S_ACCOUNT_TYPE" tgt="T_ACCOUNT_TYPE1"/>]
     [<TargetColumnValue col="T_ACCOUNT_TYPE1" val="NULL"/>]  → [<SourceColumnValue col="S_ACCOUNT_TYPE" val="CHECKING"/>]
     [<TargetColumnValue col="T_ACCOUNT_TYPE1" val="NULL"/>]  → [<SourceColumnValue col="S_ACCOUNT_TYPE" val="CHECKING"/>]
     [<TargetColumnValue col="T_SAVINGSBAL" val="NULL"/>]  → [<ColumnEquality src="S_ACCOUNT_TYPE" tgt="T_ACCOUNT_TYPE2"/>]
     [<TargetColumnValue col="T_SAVINGSBAL" val="NULL"/>]  → [<SourceInTarget src="S_ACCOUNT_TYPE" tgt="T_ACCOUNT_TYPE2"/>]
     [<TargetColumnValue col="T_SAVINGSBAL" val="NULL"/>]  → [<SourceInTarget src="S_ACCOUNT_TYPE" tgt="T_ACCOUNT_TYPE2"/>]
     [<TargetColumnValue col="T_SAVINGSBAL" val="NULL"/>]  → [<TargetInSource src="S_ACCOUNT_TYPE" tgt="T_ACCOUNT_TYPE2"/>]
     [<SourceColumnValue col="S_ACCOUNT_TYPE" val="SAVINGS"/>]  → [<ColumnEquality src="S_ACCOUNT_TYPE" tgt="T_ACCOUNT_TYPE1"/>]
     [<SourceColumnValue col="S_ACCOUNT_TYPE" val="SAVINGS"/>]  → [<SourceInTarget src="S_ACCOUNT_TYPE" tgt="T_ACCOUNT_TYPE1"/>]
     [<SourceColumnValue col="S_ACCOUNT_TYPE" val="SAVINGS"/>]  → [<TargetInSource src="S_ACCOUNT_TYPE" tgt="T_ACCOUNT_TYPE1"/>]
     ...
```

FIG. 9a: Simple Mapping

Each association rule of type:
```
R_i:    [<True/>]→[<ColumnEquality src="SCol_i" tgt="TCol_i"/>] (confidence(R_i), support(R_i))
``` is equivalent to the transformation:
```
T_i:    TCol_i=SCol_i
        Where:
        Confidence(T_i) = confidence(R_i)
```

FIG. 9b: Scalar functions

Each association rule of type:
```
R_i:    [<True/>]→[<ScalarFunctionEquality name="fnName_i" src="SCol_i" col="TCol_i"/>]
        (confidence(R_i), support(R_i))
``` is equivalent to the transformation:
```
T_i:    TCol_i=fnName_i (SCol_i)
        Where:
        Confidence(T_i) = confidence(R_i)
```

FIG. 9c : Key Lookup

Each group of association rules of type:
```
R_i:[<SourceColumnValue col="SCol" val="SVal_i"/>]→[<TargetColumnValue col="TCol"
    val="TVal_i"/>](confidence(R_i), support(R_i))
```

(where SCol and TCol are constant within the group)

is equivalent to the transformation:
```
T_i: TCol = Key Lookup of SCol
     Where:
```

$$TCol = \begin{cases} TVal_1 \text{ if } SCol = SVal_1 \\ TVal_2 \text{ if } SCol = SVal_2 \\ ... \\ TVal_i \text{ if } SCol = SVal_i \end{cases} \quad \text{confidence}(T_i) = \frac{\sum \text{support}(R_i) * \text{confidence}(R_i)}{\sum \text{support}(R_i)}$$

FIG. 9d: Pivot

Each group of association rules of type:
R$_i$: [ TargetColumnValue col="pivotCol" val="pivotVal$_i$"/>] → [ <ColumnEquality src="SCol$_i$" tgt="pivotedCol"/>]
(confidence(R$_i$), support(R$_i$))
(where pivotCol and pivotedCol are constant within the group)

is equivalent to the transformation:
T$_i$: pivotCol, pivotedCol are the result of a pivot of SCol$_1$, SCol$_2$, ..., SCol$_i$
Where:

$$pivotCol = \begin{cases} SCol_1 \text{ if } pivotedCol = pivotVal_1 \\ SCol_2 \text{ if } pivotedCol = pivotVal_2 \\ ... \\ SCol_i \text{ if } pivotedCol = pivotVal_i \end{cases}$$

$$confidence(T_i) = \frac{\sum support(R_i) * confidence(R_i)}{\sum support(R_i)}$$

FIG. 9e: Reverse Pivot

Each group of association rules of type:
R$_i$: [ SourceColumnValue col="pivotCol" val="pivotVal$_i$"/>] → [ <ColumnEquality src="pivotedCol" tgt="TCol$_i$"/>]
(confidence(R$_i$), support(R$_i$))
(where pivotCol and pivotedCol are constant within the group)

is equivalent to the transformation:
T$_i$: TCol$_1$, TCol$_2$, ..., TCol$_i$ are the result of a reverse pivot of pivotedCol with pivotCol as pivot
Where:

$$\begin{cases} TCol_1 = pivotedCol \text{ if } pivotCol = pivotVal_1 \\ TCol_2 = pivotedCol \text{ if } pivotCol = pivotVal_2 \\ ... \\ TCol_i = pivotedCol \text{ if } pivotCol = pivotVal_i \end{cases}$$

$$confidence(T_i) = \frac{\sum support(R_i) * confidence(R_i)}{\sum support(R_i)}$$

FIG. 9f: String concatenation

Each group of association rules of type:
$R_i$:[ <True/>] ➔[ <SourceInTarget src="SCol$_i$" tgt="TCol"/>] (confidence($R_i$), support($R_i$))
(where TCol is constant within the group)

is equivalent to the transformation:
$T_i$: TCol is the result of the concatenation of SCol$_1$, SCol$_2$, ..., SCol$_i$
where:

$$\text{confidence}(T_i) = \frac{\sum_{i=1}^{N} \text{confidence}(R_i)}{N}$$

FIG. 9g: String split / Substring

Each group of association rules of type:
$R_i$:[ <True/>] ➔[ <TargetInSource src="SCol" tgt="TCol$_i$"/>] (confidence($R_i$), support($R_i$))
(where SCol is constant within the group)

If the group contains only one rule of that type, it is equivalent to the transformation:
$T_i$: TCol$_i$ is a substring SCol If the group contains more than one rule of that type, it is equivalent to the transformation:
$T_i$: TCol$_1$, TCol$_2$, ..., TCol$_i$ are the result of a split of SCol $$\text{confidence}(T_i) = \frac{\sum_{i=1}^{N} \text{confidence}(R_i)}{N}$$

FIG. 11

| ID | AVG_BAL | AGE | MIN AVG_BAL | MAX AVG_BAL | MEAN AVG_BAL | SUM AVG_BAL | MIN AGE | MAX AGE | MEAN AGE | SUM AGE | TOT_BAL | DECADE |
|---|---|---|---|---|---|---|---|---|---|---|---|---|
| 0 | -41.04 | 32 | -110.96 | -41.04 | -76 | -152 | 32 | 32 | 32 | 64 | -152 | 30 |
| 0 | -110.96 | 32 | -110.96 | -152 | -76 | -152 | 32 | 32 | 32 | 64 | -152 | 30 |
| 1 | -103 | 38 | -103 | -103 | -103 | -103 | 38 | 38 | 38 | 38 | -103 | 40 |
| 2 | -72 | 52 | -72 | -72 | -72 | -72 | 52 | 52 | 52 | 52 | -72 | 50 |
| 3 | -48.18 | 72 | -48.18 | -17.82 | -33 | -66 | 72 | 72 | 72 | 144 | -66 | 70 |
| 3 | -17.82 | 72 | -48.18 | -17.82 | -33 | -66 | 72 | 72 | 72 | 144 | -66 | 70 |

Aggregation functions on source columns — Target columns to explain

TOT_BAL=SUM(AVG_BAL)

FIG. 13

| Source columns | | Product of source cols | Target columns to explain | | | | |
|---|---|---|---|---|---|---|---|
| AVG_BAL | AGE | AVG_BAL*AGE | TOT_BAL | BIRTHYEAR | DECADE | SAVINGSBAL | CHECKINGBAL |
| -41.04 | 32 | -1313.28 | -152 | 1975 | 30 | -41.04 | -110.96 |
| -110.96 | 32 | -3661.68 | -152 | 1975 | 30 | -41.04 | -110.96 |
| -103 | 38 | -3914 | -103 | 1969 | 40 | -103 | |
| -72 | 52 | -3744 | -72 | 1955 | 50 | -72 | |
| -48.18 | 72 | -3468.96 | -66 | 1935 | 70 | -17.82 | -48.18 |
| -17.82 | 72 | -1283.04 | -66 | 1935 | 70 | -17.82 | -48.18 |
| 0 | 10 | 0 | 0 | 1997 | 10 | 0 | |
| 0 | 12 | 0 | 0 | 1995 | 10 | 0 | 0 |
| 0 | 12 | 0 | 0 | 1995 | 10 | 0 | 0 |
| 0 | 12 | 0 | 0 | 1995 | 10 | 0 | |
| 0 | 12 | 0 | 0 | 1995 | 10 | 0 | |
| 0 | 12 | 0 | 0 | 1995 | 10 | 0 | 0 |
| 0 | 12 | 0 | 0 | 1995 | 10 | 0 | 0 |

BIRTHYEAR=2007.0-1.0*AGE

DISCOVERING TRANSFORMATIONS APPLIED TO A SOURCE TABLE TO GENERATE A TARGET TABLE

BACKGROUND OF THE INVENTION

1. Field

The present invention relates to a method, system, and article of manufacture for discovering transformations applied to a source table to generate a target table.

2. Description of the Related Art

Database users may perform various operations known as transformations on source data tables to produce target data tables. For instance, a business may transform certain financial or customer information into target data by taking the sum or averages of data in a column. Transformations may include string and arithmetic functions, simple column mappings in which the value of a source column is copied unmodified to a target column, aggregates, and user-defined functions.

FIGS. 1a-1j provide examples of transformations known in the art. FIGS. 1a-1h provide examples of value-based correlation, or association transformations that associate values in the source data with values in the target data by means of their actual values. FIG. 1a shows a simple mapping where values of one column from the source dataset are copied without modifications to another column in the target data set. FIG. 1b shows an example of a key lookup transformation where values of one column from the source data set are copied in another column in the target data set via a systematic modification of the value. Each value in the source column is transformed into another value in the target column, and the correspondence between the values may be provided in a lookup table. The example shows that each "0" in the source is converted into a "No" in the target, and each "1" in the source is converted into a "Yes" in the target. FIG. 1c provides an example of a pivot transformation where data stored in several columns of one row in the source data set is converted into a 2-column, multi-row format in the target dataset. In FIG. 1c, each row in the source table contains income values for each quarter for a specific ID. The same data is coded in the target table in a different form. Each row in the target contains the income for a specific ID and a specific quarter, such that the data contained in the first row of the source table is stored in the first 4 rows of the target table.

FIG. 1d illustrates a reverse-pivot transformation, which is the opposite of a pivot transformation, such that data stored in the same column over several rows in the source table is stored in one row and several columns in the target. FIG. 1e illustrates an example of a string concatenation transformation where values of two or more columns of the source data set are concatenated into one single column value in the target data set. FIG. 1f illustrates an example of a string split transformation, which is the opposite of a concatenation, such that a single column value in the source dataset is split into several column values in the target. FIG. 1g illustrates an example of a substring transformation where a subset of a string value in a source column is copied in a column of the target data set. FIG. 1h illustrates an example of a scalar function in which the value of one column in the target data set is computed from the result of a scalar or user-defined function on the values of one or more columns in the source data set.

FIG. 1i illustrates an example of an aggregation type transformation where the column values from several rows from the source data set can be grouped by a key and aggregated value into a single row in the target data set by using an aggregation function. Examples of aggregate functions include sum, mean, maximum, minimum, standard deviation or other statistics that can be computed for a group of values.

FIG. 1j illustrates an example of an arithmetic type transformation, where the arithmetic transformation computes the numeric value in the target column from a polynomial of several numeric column values in the source data set.

An organization or enterprise may hire programmers to write, compile and test the programs that transform source data sets to target data sets. However, over time information on the transformations that were used to produce target data sets may disappear from the organization for a variety of reasons, including poor documentation, loss of the source (uncompiled) version of the software, loss of the developers who wrote the software, or lack of available skills in the programming language (e.g., COBOL). This leaves the enterprise in a precarious position of not being able to maintain, upgrade or migrate critical software programs unless they can recreate the transformations that relate the source data to the target data.

Reconstructing an understanding of the transformations may be undertaken by a person reviewing the source program including the transformation or source and target data. If the source program including the transformation is available, the enterprise can hire an expert to review the source, create documentation, and/or design and implement a migration to a more maintainable software platform (e.g., COBOL to Java). If the source program including the transformation is not available, then typically a person visually inspects the source and target data values and tries to derive the transformations via trial and error. In either case, the cost in terms of time and money is significant, and the manual nature of the process introduces possibilities for misinterpretation and error.

There is a need in the art for improved techniques for determining transformations used to produce target data sets from source data sets.

SUMMARY

Provided are a method, system, and article of manufacture for discovering transformations applied to a source table to generate a target table. Selection is made of a source table comprising a plurality of rows and a target table resulting from a transformation applied to the rows of the source table. A first pre-processing method is applied with respect to columns in the source and target tables to produce first category pre-processing output. The first category pre-processing output is used to determine first category transformation rules with respect to at least one source table column and at least one target table column. For each unpredicted target column in the target table not predicted by the determined first category transformation rules, a second pre-processing method is applied to columns in the source table and unpredicted target columns to produce second category pre-processing output. The second category pre-processing output is used to determine second category transformation rules with respect to at least one source table column and at least one target table column.

In a further embodiment, for each unpredicted target column in the target table not predicted by any determined first and second category transformation rules, a third processing method is applied to columns in the source table and unpredicted target columns to produce third category preprocessing output. The third category pre-processing output is used to determine third category transformation rules with respect to at least one source table column and at least one target table column.

In a further embodiment, the first category transformation rules comprise valued based transformations, the second category transformation rules comprise aggregate transformations, and the third category transformation rules comprise arithmetic transformations.

In a further embodiment, applying the first pre-processing method comprises applying first category tests to the source and target table columns to produce first category test output. The first category pre-processing output comprises the first category test output.

In a further embodiment, using the first category test output comprises: processing, by a data mining engine, the first category test output to produce a data mining model defining patterns in source and target columns that occur together and processing, by a rules post-processor, the data mining model to determine first transformation rules that produce the patterns in the data mining model.

In a further embodiment, the applying of the first pre-processing method comprises: joining the rows of the source and target tables to produce a joined table, wherein each row of the joined table includes the columns of the source and target tables; for rows of the joined table, outputting one row for columns in the joined table having an identifier of the row of the joined table and a name and value of the column in the joined table; performing the first category tests on the output rows; and for instances where one of the output rows passes one of the first category tests, generating one test output row identifying the row identifier for which the first category test passed and information identifying the test.

In a further embodiment, a counter is maintained for each performed first category test indicating a number of times the performed first category test failed with respect to the output rows to which the first category test is applied. Application of the first category test whose counter exceeds a threshold value is stopped.

In a further embodiment, indication is made of a plurality of first category tests, wherein each first category test is performed on the first category test output rows. A counter is initiated for each of the first category tests indicating a number of times the performed first category test failed with respect to the output rows. Indication of the first category test whose counter exceeds a threshold value is removed, wherein first category transformation rules are determined from the first category tests whose counters do not exceed the threshold values for the first category tests.

In a further embodiment, the first category tests are members of a set of association rule tests to determine whether the source column and target column pairs match and are substrings of one another.

In a further embodiment, the second pre-processing method, comprises: joining the rows of the source and target tables to produce a joined table having undiscovered target numerical columns from the target table, wherein applying the second pre-processing method comprises performing at least one function on rows in each column of the source table grouped by a key to produce at least one result column; applying functions to the source table columns to produce result columns; and determining whether each result column for the key matches one undiscovered target numerical column value for the key, wherein the second category pre-processing output comprises information on result columns from the source table columns that match undiscovered target table numerical columns.

In a further embodiment, the functions applied to the source table columns are a member of a set of aggregation functions comprising summing, minimum, maximum, and average.

In a further embodiment, the second category pre-processing output indicates a minimum specified percentage of time the result columns match the undiscovered target numerical columns.

In a further embodiment, the second pre-processing method is performed in response to determining that there is at least one undiscovered numerical target column and there is one row in the target table corresponding to a plurality of rows in the source table.

In a further embodiment, the third pre-processing method comprises: joining the rows of the source and target tables to produce a joined table having undiscovered target numerical columns from the target table; performing a regression analysis on the numerical source columns to determine a regression equation predicting one undiscovered target numerical column, wherein the second category pre-processing output indicates regression equations and their confidence levels.

In a further embodiment, the determined first and second category transformation rules are presented for user review and stored in a repository.

BRIEF DESCRIPTION OF THE DRAWINGS

FIGS. 1a-1j illustrate examples of transformations on a source table to a target table in manners known in the prior art.

FIG. 6 illustrates an example of joining the rows of the source and target tables.

FIG. 7 illustrates an example of test output generated while applying valued based rule category tests to determine value based transformation rules.

FIG. 8 illustrates an example of value based category transformation rules determined from the test output.

FIGS. 9a-9g illustrate a set of patterns and formulas used to find transformation functions in the output produced according to the operations of FIG. 3

FIG. 11 illustrates an example of output generated while applying the aggregation pre-processing method to discover aggregation transformation rules.

FIG. 13 illustrates an example of pre-processing output for arithmetic rule discovery.

DETAILED DESCRIPTION

Figure 2:
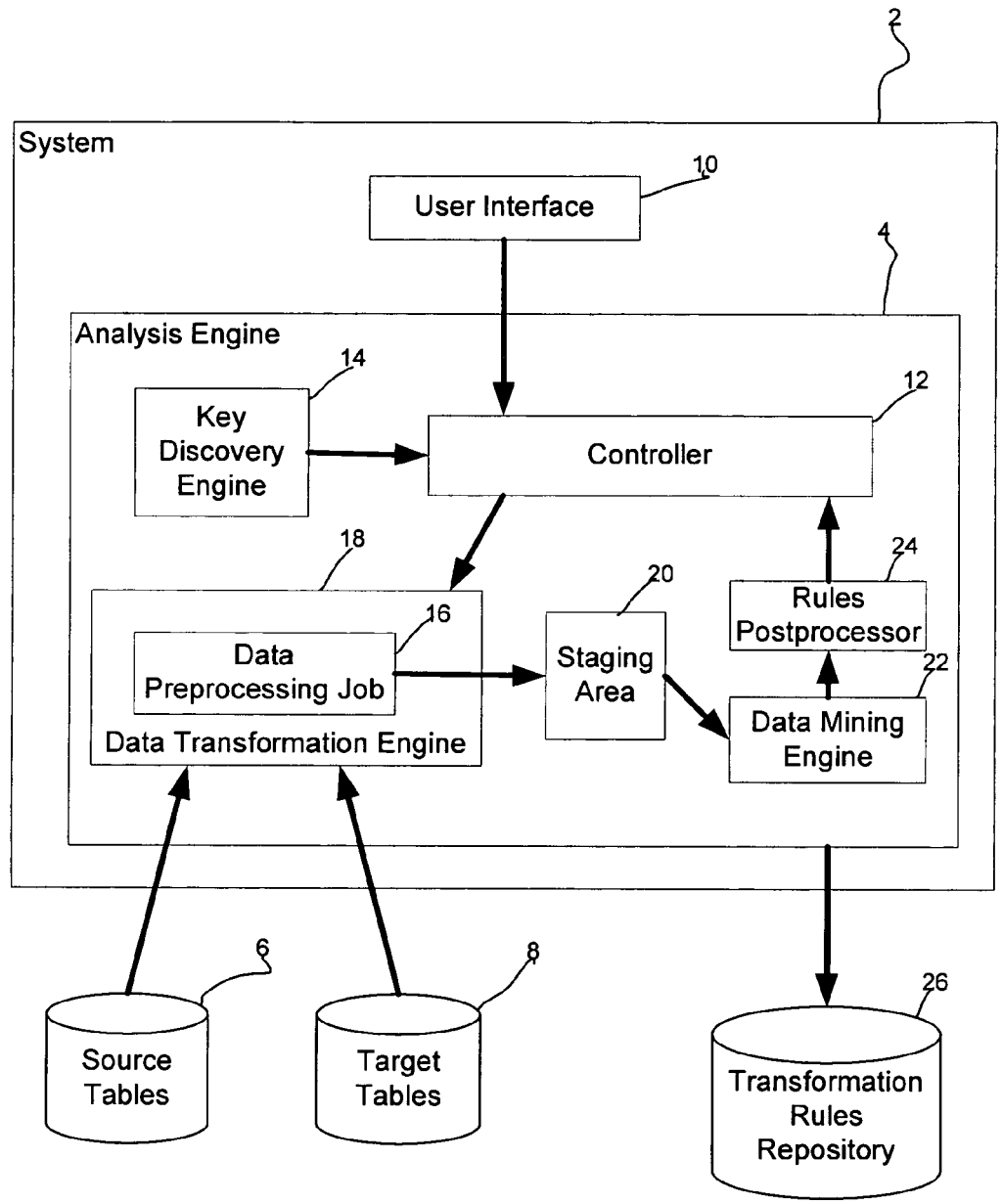
FIG. 2 illustrates an embodiment of a computing environment.

FIG. 2 illustrates a computing environment in which embodiments may be implemented. A system 2 includes program components of an analysis engine 4 used to determine transformations applied to selected source tables 6 to generate selected target tables 8. The arrows show interactions between the components of the analysis engine 4 to determine the transformations. A user interface 10 comprises the program component that generates a graphical user interface (GUI) that enables a user to setup and launch the analysis engine 4 to discover the transformations from selected source 6 and target tables 8 and review the result of the process. The user interface 10 invokes a controller 12 which can be on the same system 2 or on a remote system. The controller 12 receives request from the user interface 10 and manages the operations of the analysis engine 4 components.

The controller 12 invokes an optional key discovery engine 14 to detect potential primary key/foreign key candidates among the available columns in a selected source table 6 and target table 8. The key discovery engine 14 operations could have been run previously to produce key results or run as part of the transformation discovery flow. Further, users may specify the join condition as part of the input provided when the discovery process is launched.

The controller 12 generates a data pre-processing job 16 for a particular type of transformation test, which is executed in a data transformation engine 18. The data transformation engine 18 executes the pre-processing job 16, joining and transforming the data from the selected source 6 and target 8 tables into a format suitable for the discovery of transformation rules. The transformation engine 18 may comprise an Extract, Transform, and Load (ETL) engine, such as the WebSphere® DataStage® engine from International Business Machine Corporation ("IBM"). (IBM, WebSphere and DataStage are trademarks of IBM in the United States and foreign countries).

The result of the pre-processing job 16 is written into a staging area 20 of the analysis engine 4. The staging area 20 may comprise a database or any other data storage mechanism, and the data sources 6 and targets 8 may comprise tables in relational databases, or flat files on a file system or any other storage mechanism suitable for structured data. The use of the term table may refer to relational database tables or other data structures and objects that group data. The use of the term rows and columns may refer to relational database table columns and rows or other groupings of data in a data object.

Once the data pre-processing 16 is complete, a data mining engine 22 is invoked to compute appropriate data mining models on the result of the pre-processing in the staging area 20. The data mining engine 22 may comprise suitable mining engines known in the art, such as IBM DB2® Intelligent Miner. (DB2 and Intelligent Miner are trademarks of IBM in the United States and foreign countries)

The mining models produced by the data mining engine 22 are analyzed by a rules postprocessor 24 to detect and produce transformation rules. The rules are passed to the controller 12 which evaluates and determines if further iterations are necessary, or determines if the result should be presented to the user via the user interface 10 or stored in a transformation rules repository 26. After the final iteration, the transformation rules discovered by the engine are finally stored in the repository 26.

The system 2 may include one or more processors, a volatile memory, and one or more storage device. The analysis engine 4 and user interface 10 programs may be loaded into the memory from a storage device and executed by the system 2 processor. Alternatively, the analysis engine 4 or certain components thereof may be implemented in hardware components.

Figure 3:
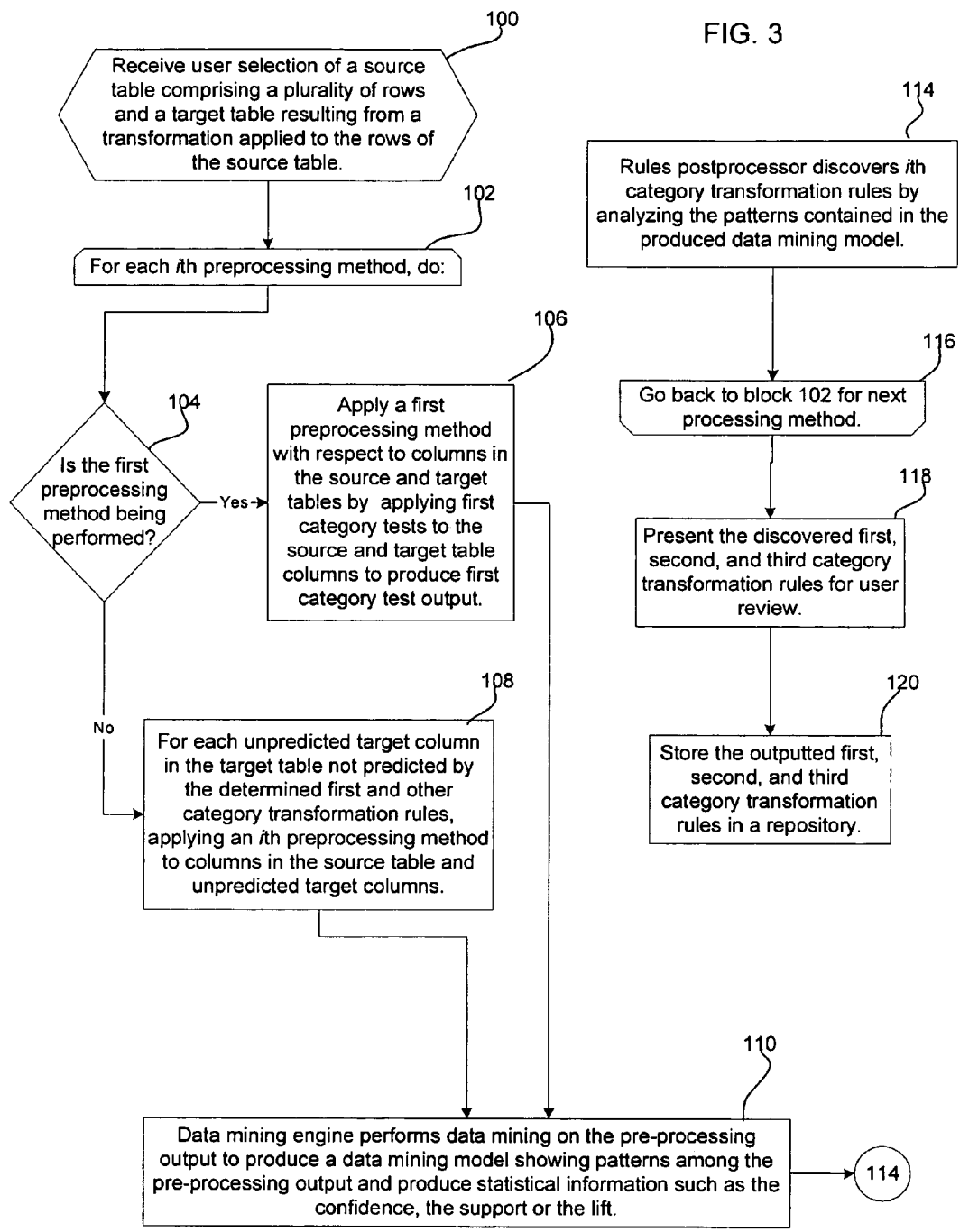
FIG. 3 illustrates an embodiment of operations to discover multiple categories of transformations used to generate target data from source data.

FIG. 3 illustrates an embodiment of operations performed by the analysis engine 4 to determine transformation rules used to transform data in columns in a selected source table 6 to columns in a target table 8, where the transformation of the data may have been previously performed. Control begins at block 100 upon the analysis engine 4 receiving user selection via the user interface 10 of a source table 6 comprising a plurality of rows and columns and a target table 8 resulting from one or more transformations applied to the rows of the source table 6. The analysis engine 4 performs a loop of operations at block 102 through 116 for each pre-processing method to preprocess data as part of discovering transformation rules for a category of transformations. In described embodiments, several pre-processing/analysis/post-processing methods are used to detect different families of transformations. The different families of transformations may comprise value based transformations (FIGS. 1a to 1h), aggregation transformations (FIG. 1i), and arithmetic transformation (FIG. 1j).

If (at block 104) the first pre-processing method is being performed, then a first pre-processing method is applied (at block 106) with respect to columns in the source and target tables by applying first category tests to the source and target table columns to produce first category test output. The first category tests may test if values in a pair of target or source columns are equal or not, if the value in one column is a substring of another, and produce output indicating the results of these tests. The first category tests may be used to prepare the data to determine first category transformation rules comprising value based transformation, such as a simple mapping, key lookup, pivot, reverse pivot, string concatenation, string split, substring, scalar function, etc.

If (at block 104) the ith pre-processing method is not the first, then for each unpredicted target column in the target table not predicted by the determined first and other category transformation rules, an ith pre-processing method is applied (at block 108) to columns in the source table and unpredicted target columns.

After performing the pre-processing at blocks 106 or 108, the data mining engine 22 component of the analysis engine 4 performs (at block 110) data mining with respect to the category test output to produce a data mining model showing patterns among the pre-processing output and produce statistical information such as the confidence, the support or the lift, are associated with each rule. The rules postprocessor 24 discovers (at block 114) ith category transformation rules by analyzing the patterns contained in the produced data mining model.

Figure 4:
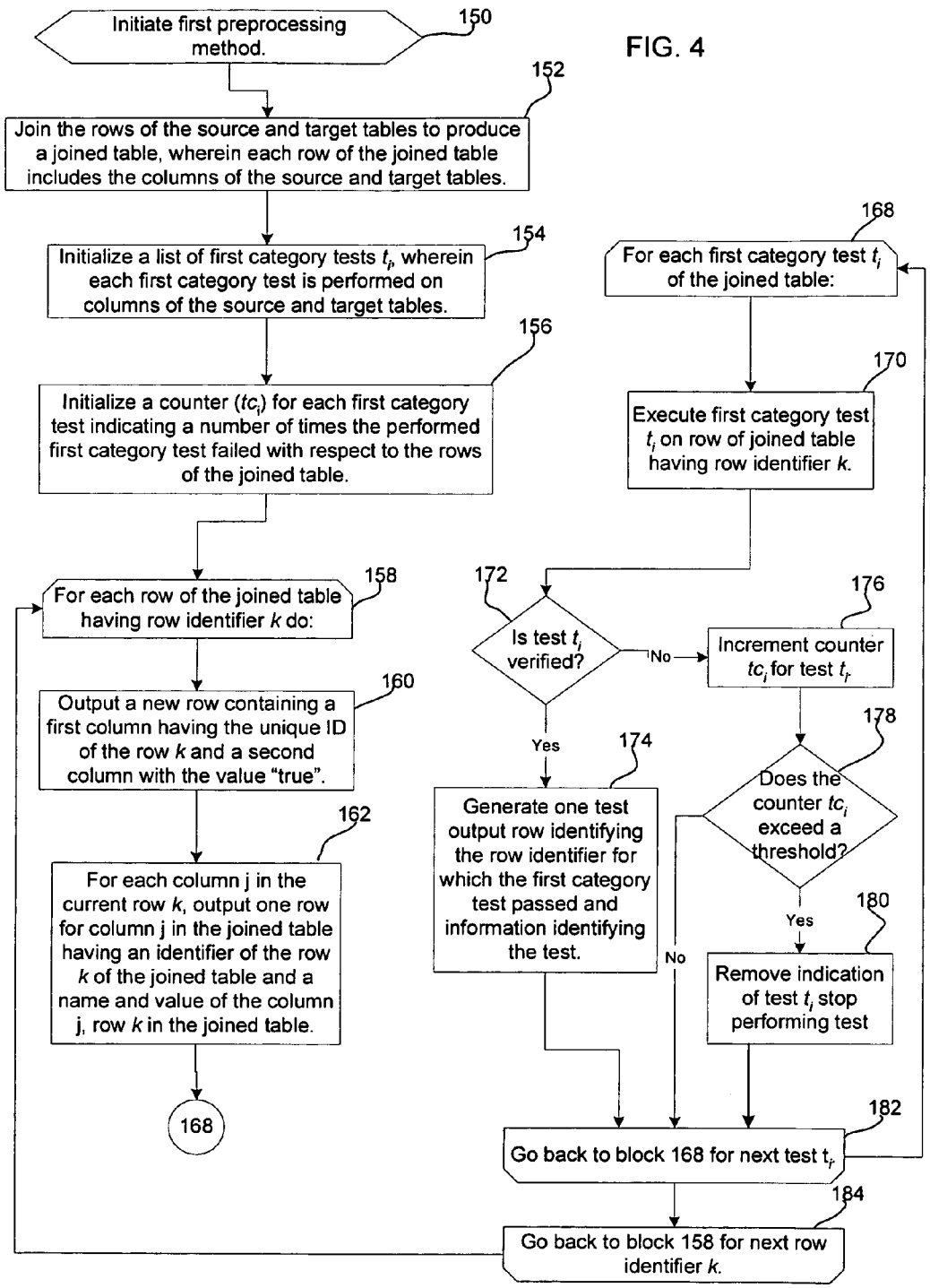
FIG. 4 illustrates an embodiment of operations of a first category pre-processing method to discover first category transformation rules that predict target columns from source columns.

For the first category of transformation (e.g. value based), the pre-processing (at block 106) consists on applying a series of simple tests and outputting a 2 columns format table as described in FIGS. 4 and 7. The mining step consists in building an association model on the output, by using an algorithm such as an Apriori algorithm, to obtain an association model. The post-processing consists on searching for patterns of rules (like in FIGS. 9a-9g) giving indications of real transformations For the aggregation transformations, the pre-processing at block 108 consist of pre-computing the result of all possible aggregation functions on all numerical source columns, as in FIG. 10. The mining step may consist again in building an association model on the output to detect simple mappings between the pre-computed source columns and the pre-computed source columns and the target columns. The post-processing consists on searching for the simple mapping pattern in the mapping rules (like in FIG. 9a) indicating a real transformation.

For the arithmetic transformations, the pre-processing may comprise building a view containing the numeric columns and all cross products between the numerical source columns. The mining consist in building a linear regression or polynomial regression model for each numerical target column in function of all numerical source columns and computed cross-product columns. The post-processing process may analyze each produced model, check if a mean squared error is sufficiently low, and extract the polynomial equation from the model if the error meets the minimum requirement.

In one embodiment, the algorithms to implement the first, second and third pre-processing methods may be implemented in separate data pre-processing jobs 16 executed in the data transformation engine 18. Further, there may be additional category pre-processing methods to determine additional transformation type rules for unpredicted target columns after the first, second, and third category pre-processing methods are applied. Yet further, there may be only one or two category pre-processing methods to determine one or two different category type transformation rules.

After executing all the post-processing methods (at block 114) performed during execution of the loops at blocks 102 through 116), the analysis engine 4, or controller 12 in particular presents (at block 118) the first, second, and/or third category transformation rules to the user interface 10 for user review. The outputted first, second and/or third category transformations may be stored (at block 120) in the transformation rules repository 26. The transformation rules of all or less than all category types may predict values in the target table 8 from the values in the source table 6 with a specified level of confidence.

The pre-processing algorithms, data mining techniques and post-processing algorithms used during the detection of each category of transformations is specific to the category of transformations being discovered. For instance, value based and aggregation functions may have different pre-processing steps, but share the same data mining and post-processing steps. Arithmetic transformations may differ in pre-processing, data mining, and post processing operations. An association model containing association rules may be computed to detect the existence of value based transformations.

FIG. 4 illustrates an embodiment of operations performed by the analysis engine 4, such as a data pre-processing job 16, to perform the first pre-processing method to produce first preprocessing output results that are used to determine first category transformations. In the embodiment of FIG. 4, the first category tests comprise tests to determine whether source and target columns are equal, are substrings of one another, etc. Upon initiating the first pre-processing method (at block 150), the analysis engine 4 joins (at block 152) the rows of the source 6 and target tables 8 to produce a joined table, wherein each row of the joined table includes the columns of the source and target tables. The join may comprise an inner join, where the records from the source and target tables are joined with each other using a pair of keys or compound keys which allow identification of which records of the source corresponds to which records of the target. The analysis engine 4 may initialize a list of a plurality of first category tests ($t_i$) (at block 154) to perform wherein each first category test ($t_i$) is performed on the source and target columns to determine whether values in one or more columns of the source table are related to values in the target table columns, such as equal, a substring of, etc. There may be separate first category tests ($t_i$) executed on separate pairs or groups of columns to test for column equality (col1=col2) and value containments (value of col1 is contained in value of col2). The analysis engine 4 may further initialize (at block 156) a test counter ($tc_i$) for each first category test ti indicating a number of times the performed first category test ($t_i$) failed with respect to the rows of the joined table.

The analysis engine 4 performs a loop of operations at blocks 158 through 184 for each row of the joined table having row identifier k. At block 160, the analysis engine 4 outputs a new row containing a first column having the unique ID of the row k and a second column with the value "true". For each column j in row k, one row is outputted (at block 162) for column j in the joined table having an identifier of the row k of the joined table and a name and value in the column j, row k in the joined table.

After generating the output rows for row k, the analysis engine 4 performs the operations at block 168 to 182 to execute each first category test ($t_i$) in the list against row k of the joined table. All the first category tests may be executed by one data processing job 16. At block 170, the analysis engine 4 executes the first category test ($t_i$) on the row of the joined table having row identifier k. The category test ($t_i$) may be performed on every pair of source and target columns for the same row identifier (k). The tests ($t_i$) may comprise simple functions to apply to one or several column values. Each test ($t_i$) may return a boolean result indicating that the application of the test condition to the source column resulted in the target column for row k. One example is an equality test for each pair of source and target columns. If the columns have the same values in the current row, the result is true, and otherwise false. These first category test output results are used to detect simple mappings, key lookups, pivots and reverse pivots. A containment test is performed for each pair of source and target columns having the same row identifier in the joined table. If the value of one column contains the value of the other column, the result is true, and otherwise false. The output from these tests may be used to detect string functions such as concatenations, splits, and substrings.

If (at block 172) the test ($t_i$) is verified, i.e., the test succeeds on at least one source/target column pair having row identifier k, then the analysis engine 4 generates (at block 174) one test output row identifying the row identifier for which the first category test passed and information identifying the test ($t_i$) and the source/column pair on which the test succeeded. If the test ($t_i$) as applied to the output rows is not verified with respect to one source/column pair values in output rows having the row identifier k, then the test counter ($tc_i$) is incremented (at block 176). If (at block 178) the test counter ($tc_i$) for test ($t_i$) exceeds a failure threshold, then indication of the test ($t_i$) is removed (at block 180) from the list and no more testing is performed for that specific test ($t_i$) because the test failed on a threshold number of joined table rows.

The results of the tests of first category tests are rows of data indicating a row identifier, test result, column values in the second column. Each group of items grouped by a row identifier represents a transaction. The data mining engine 22 may further process the results of the first category tests to determine patterns based on the output results. The rules postprocessor 24 may process the data mining model output of the data mining engine to determine transformation rules having a predefined confidence level.

Figure 5:
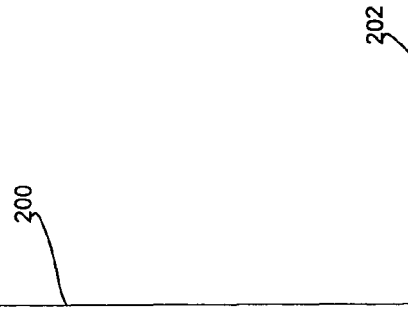
FIG. 5 illustrates an example of source and target tables.

FIG. 5 illustrates an example of source 200 and target 202 tables of data. FIG. 6 illustrates an example of a joined table 204 formed by joining rows of the source 200 and target 202 tables, such as performed at operation 152 in FIG. 4. FIG. 7 provides an example 206 of the output obtained as a result of the operations of FIG. 4, comprising a new data set containing two columns. The first column identifies the input rows (by their ID). The second column of the output row contains a parsable string in Extensible Markup Language (XML) format which contains one of the following:

<True/> indicator (once for each input row).

Value of a source or target column (the syntax shown is <SourceColumnValue src="columnName" val="value"/> to indicate the value of a source column, and <TargetColumnValue src="columnName" val="value"/> to indicate the value of a target column.)

An identifier of a test that was positive for the specific input row.

<ColumnEquality src="srcColName" tgt="tgtColName"/> indicates that for this specific input row, the values in the source column srcColName and the target columns tgtColName were equals.

<SourceInTarget src="srcColName" tgt="tgtColName"/> indicates that for this specific input row, the value of the target column tgtColName contains the value of the source column srcColName (srcColName is a substring of tgtColName)

<TargetInSource src="srcColName" tgt="tgtColName"/> indicates that for this specific input row, the value of the source column srcColName contains the value of the target column tgtColName (tgtColName is a substring of srcColName)

In certain embodiments, such as shown in FIG. 7, XML syntax is used. In additional embodiments, other syntaxes may be used that are parsable by the rules postprocessor 24.

The data mining engine 22 may compute a data mining association model from the pre-processing result, an example of which is shown in FIG. 8. The first column of the output data set may be used as the transaction ID during the mining process, while the values in the second column are used as items. Thus, transactions in the association model contain the pre-processing results for one input row in the combined join dataset. The result of the mining process is a data mining model containing the association model transformations. Each association rule defines a pattern showing which items of the prepared data occur together within the same transaction. Additionally, statistical information such as the confidence, the support or the lift, may be associated with each rule.

FIG. 8 provides an example of data mining association model output computed over the pre-processing results of applying the various first category tests over the sample data of FIG. 5. For example the first rule 210 "[<True/>]==>[<ColumnEquality src="S_NAME" tgt="T_NAME"/>]" indicates that whenever <True/> was produced for an input row (which is always the case), <ColumnEquality src="S_NAME" tgt="T_NAME"/> was also always produced. In other words, the source column S_NAME and the target column T_NAME are always equal. The fourth rule 212 "[<True/>][<SourceInTarget src="S_ZIP" tgt="T_ADDRESS"/>]" indicates that the source column S_ZIP is fully contained in the target column T_ADDRESS. The sixth rule 214 "[<ColumnEquality src="S_ACCOUNT_TYPE" tgt="T_ACCOUNT_TYPE1"/>]==>[<SourceColumnValue col="S_ACCOUNT_TYPE" val="SAVINGS"/>] indicates that whenever the source column S_ACCOUNT_TYPE and target column T_ACCOUNT_TYPE1 are equal in an input row, the value of the source column S_ACCOUNT_TYPE is usually "SAVINGS".

FIGS. 9a-9g illustrate a set of patterns and formulas used to find transformation functions discovered by the rules postprocessor 24 based on the test results for the value-based correlation family: FIG. 9a provides the pattern used to detect simple mapping transformation functions in the association model containing rules of type

[<True/>]==>[<ColumnEquality src="SColi" tgt="TColi"/>].

Each time such a rule is detected in the model, a simple mapping between the source column SColi and the target column TColi has been detected. The support and confidence of the transformation function is the same as the support and confidence of the association rule.

FIG. 9b provides the pattern used to detect scalar transformation functions in the association model containing rules of type

[<True/>]==>[<ScalarFunctionEquality name="fnNamei" src="SColi" col="TColi"/>], which indicates the existence of such a transformation, where SColi, TColi and fnNamei are the name of the source column, target column, and scalar function. As for simple mappings, the support and confidence of the transformation is the same as for the association rule.

FIG. 9c provides the pattern used to detect key lookup transformation functions in the association model from a group of association rules in the association model. Whenever a group of association rules of type

[<SourceColumnValue col="SCol" val="SVali"/>]=> [<TargetColumnValue col="TCol" val="TVali"/>]

is detected in the association model, such that the name of the source column SCol and of the target column TCol is constant among all rules of the group, then a key lookup transformation function has been detected. The values of the key lookup are given by the values in the association rules. The confidence of the transformation rule can be computed by adding the product of the confidence and support of each association rule composing the group and dividing that result by the sum of the rules' support.

FIGS. 9d and 9e provides the patterns used to detect pivots and reverse pivot rules detected in a similar way as key lookups, differing only in the types of association rules to analyze.

FIG. 9f provides the pattern used to detect string concatenation transformation functions from a group of association rules in the association model. Whenever a group of association rules of type

[<True/>]==>[<SourceInTarget src="SColi" tgt="TCol"/>]

is detected in the association model, such that where the target column TCol is constant within the groups, then a string concatenation transformation function has been detected. The confidence of this transformation is the mean confidence of the rules in the group. The detection of the pattern in the association model indicates only the existence of such a transformation. To detect the exact specification of the concatenation (order of concatenation, whether constant string are also concatenated or not), a further analysis on a few rows must be performed.

FIG. 9g provides the pattern used to detect substring and string split transformation functions from a group of association rules in the association model. Whenever a group of association rules of type

[<True/>]==>[<TargetInSource src="SCol" tgt="TColi"/>]

is detected in the association model, such that the source column SCol is constant within the groups, then a substring transformation function has been detected (if the group is made up of one single association rule), or string split transformation function has been detected (if the group is made up of more than one association rule). As for 9*f*, the detection of this pattern only indicates the existence of such a transformation function. The exact specification of the transformation function (indexes of the substring/split) can be detected by analyzing records.

Figure 10:
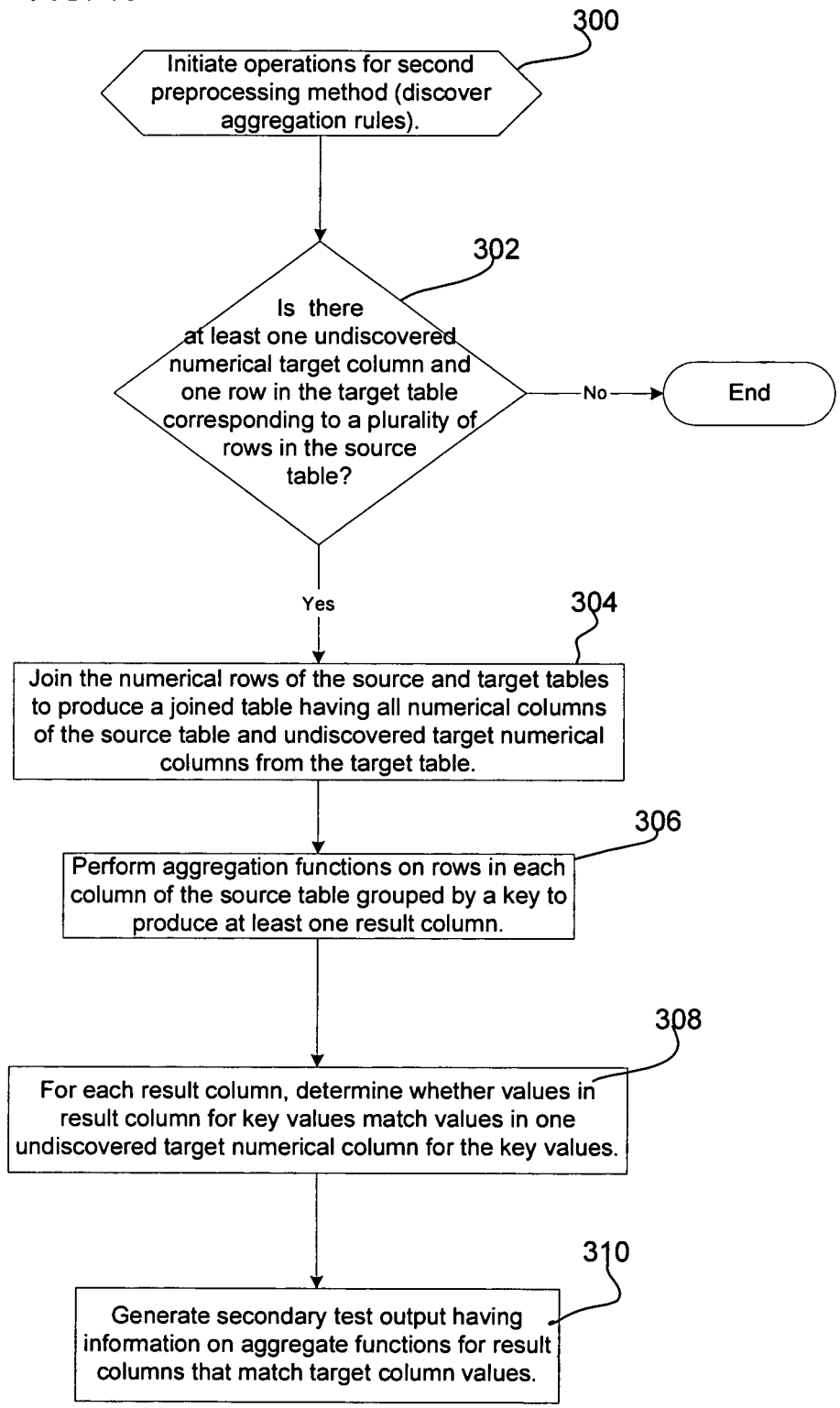
FIG. 10 illustrates an embodiment of operations to apply an aggregation pre-processing method to discover aggregation transformation rules that predict target columns from source columns.

FIG. 10 illustrates an embodiment of operations the analysis engine 4, such as a data processing job 16, performs for the second pre-processing method to apply second category tests to produce second pre-processing output that may be used by the data mining engine and rules postprocessor to determine aggregation transformation rules on source columns that predict target columns. Upon initiating (at block 300) the second pre-processing method, the analysis engine 4 determines (at block 302) whether there is at least one undiscovered numerical target column (i.e., a target column not predicted by a previously discovered first category transformation) and one row in the target table corresponding to a plurality of rows in the source, i.e., an N-to-1 relationship between the source and target tables. An N-to-1 relationship means that one record in the target table corresponds to several records in the source table. If (at block 302) there are no undiscovered numerical target columns and/or no N-to-1 relationship, then control ends without generating a second category transformation, e.g., aggregation transforms. If (at block 302) there are both undiscovered numerical target columns and an N-to-1 relationship, then the analysis engine 4 joins (at block 304) the numerical rows of the source and target tables to produce a joined table having all numerical columns of the source table and undiscovered target numerical columns from the target table. The analysis engine 4 performs (at block 306) aggregation operations on rows in each column of the source table grouped by a key to produce at least one result column having values aggregated across rows of the source table column for the grouping key. The aggregation operations may compute the minimum, maximum, mean, and sum for the different rows. The analysis engine 4 determines (at block 308) for each result column whether values in the result column equal values in one undiscovered target numerical column for the key values. In one embodiment, the test performed after the aggregate operations are applied is the equality to determine whether the target column value matches the computed aggregate value. Second category test output (at block 310) is generated having information on the aggregate functions for the result columns indicating whether the target column values match aggregate source columns a minimum percentage of times.

The operations of FIG. 10 produce secondary test output indicating how often each target column is equal to the result of each aggregation function on each source column. The data mining engine 22 and rules postprocessor 24 process the secondary test output to discover aggregation transformation rules when one of these tests is verified for a percentage of the rows which is greater or equal to a specified confidence level.

FIG. 11 illustrates an example of the second category test output of the second category pre-processing operation for the sample data of FIG. 5. The output is a data set joining the source data set with the target data set and contains the numeric columns of the target data set (TOT_BAL and DECADE), the numeric columns of the source data set (AVG_BAL and AGE) and the minimum, maximum, average and sum of the values of the source columns when the records are grouped by their key (represented by the column ID in this case). FIG. 11 shows that TOT_BAL target column is equal to the sum of AVG_BAL source column rows having a common identifier.

Figure 12:
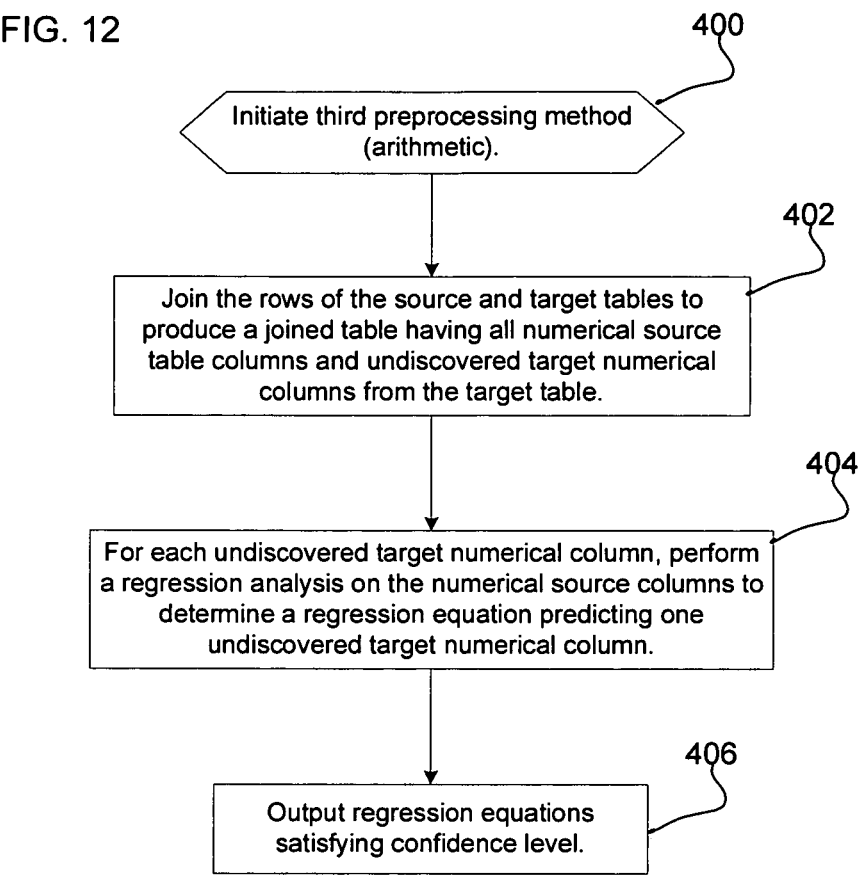
FIG. 12 illustrates an embodiment of operations to apply an arithmetic category pre-processing method to discover arithmetic transformation rules that predict target columns from source columns.

FIG. 12 illustrates an embodiment of operations the analysis engine 4, such as a data processing job 16, performs for the third pre-processing method, which generates third pre-processing output used to discover arithmetic transformations. Upon initiating (at block 400) the third pre-processing method, the analysis engine 4 joins (at block 402) the rows of the source and target tables to produce a joined table having all numerical source table columns and undiscovered target numerical columns from the target table. The third category pre-processing operations are not performed if there are no undiscovered target numerical columns, e.g., target numerical columns whose values are not explained by a previously determined transformation. For each undiscovered target numerical column, the analysis engine 4, or data processing job 16, performs (at block 404) a regression analysis on combinations of the numerical source columns to determine a regression equation predicting one undiscovered target numerical column based on one or more source columns. The determined regression equations satisfying a predefined confidence level are outputted (at block 406).

In certain embodiments, the third category pre-processing joins the rows containing only numerical columns and eventually computed columns such as the cross products between source columns. The data mining engine 22 may perform the regression analysis following the pre-processing. The rules postprocessor 24 may review the Root Mean Square Error (RMSE) of each computed regression model and extract the equation if the quality of the model is high enough (RMSE is low enough). Note that one regression analysis (one equation) may be computed for each target column separately.

To perform the arithmetic testing, the joined table may be processed to generate the products or division of source columns to optionally compute the cross-product and cross-division all pairs of source columns. Mathematical techniques, such as the analysis of the correlation of the log values of the columns may be used to evaluate the columns that may be involved in product operations, so that the amount of columns to compute can be reduced. The data processing job 16 may compute data mining regression models (linear and polynomial) with the target column as a target field and combinations of the source columns as active fields. The regression model computed may contain a polynomial which tries to explain the target column from the source and computed columns and an RMSE (Root Mean Square Error) metric indicating the accuracy of the model. If the regression model satisfies a predictive threshold (e.g., having an RMSE below a certain threshold), then the regression equation is extracted from the regression model, and an arithmetic transformation has been discovered. If the RMSE of the model is too high, then the regression equation is ignored.

FIG. 13 provides an example of the output of the pre-processing step for the arithmetic rule discovery computed on the data of FIG. 5. The result of the pre-processing contains the two numeric columns of the source data set (AVG_BAL and AGE), the cross-product of these columns and all the numeric target columns to be explained (five columns). One regression model is computed for each of the five target columns. In this example, the regression model built on the target column BIRTHYEAR has a RMSE near zero, which means that its equation can be used to explain that column:

BIRTHYEAR=2007−AGE

With the described embodiments, an analysis engine 4 may generate pre-processing output that is consumed by a mining algorithm whose output allows the determination of transformation rules used on source tables to produce target tables. The determined transformation rules may then be used on further sets of source data.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The variables "i", "j", and "k", etc. are used to denote integer instances of elements, and may indicate different or the same integer value when used with different references to the elements.

The illustrated operations of FIGS. 3, 4, 10, and 12 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. A method, comprising:
  selecting a source table in a computer readable storage medium comprising a plurality of rows and a target table in the computer readable storage medium resulting from a transformation applied to the rows of the source table;
applying a first pre-processing method with respect to columns in the source and target tables to produce first category pre-processing output;
using the first category pre-processing output to determine first category transformation rules with respect to at least one source table column and at least one target table column to predict values in the target table from values in the source table;
determining at least one unpredicted target column in the target table comprising at least one target column determined not to be predicted by the first category transformation rules;
for the at least one unpredicted target column, applying a second pre-processing method to the at least one unpredicted target column and the columns in the source table to produce second category pre-processing output; and
using the second category pre-processing output to determine second category transformation rules with respect to the at least one unpredicted target column in the target table.

2. The method of claim 1, further comprising:
for the at least one unpredicted target column in the target table not predicted by any determined first and second category transformation rules, applying a third processing method to columns in the source table and the at least one unpredicted target column to produce third category pre-processing output; and
using the third category pre-processing output to determine third category transformation rules with respect to at least one source table column and the at least one unpredicted target column in the target table.

3. The method of claim 2, wherein the first category transformation rules comprise valued based transformations, wherein the second category transformation rules comprise aggregate transformations, and wherein the third category transformation rules comprise arithmetic transformations.

4. The method of claim 1, wherein applying the first pre-processing method comprises applying first category tests to the source and target table columns to produce the first category pre-processing output, wherein the first category pre-processing output comprises first category test output.

5. The method of claim 4, wherein using the first category test output comprises:
processing, by a data mining engine, the first category pre-processing output to produce a data mining model defining patterns in source and target columns that occur together; and
processing, by a rules post-processor, the data mining model to determine first transformation rules that produce the patterns in the data mining model.

6. The method of claim 4, wherein the applying of the first pre-processing method comprises:
joining the rows of the source and target tables to produce a joined table, wherein each row of the joined table includes the columns of the source and target tables;
for rows of the joined table, outputting one row for columns in the joined table having an identifier of the row of the joined table and a name and value of the column in the joined table;
performing the first category tests on the rows in the joined table; and
for instances where one of the output rows passes one of the first category tests, generating one test output row identifying the row identifier for which a first category test passed and information identifying the passed first category test.

7. The method of claim 6, further comprising:
maintaining a counter for each performed first category test indicating a number of times the performed first category test failed with respect to the rows of the joined table to which the first category test is applied; and
stopping application of the first category test whose counter exceeds a threshold value.

8. The method of claim 6, further comprising:
indicating a plurality of first category tests, wherein each first category test is performed on the rows of the joined table;
initiating a counter for each of the first category tests indicating a number of times the performed first category test failed with respect to the rows of the joined table; and
removing indication of the first category test whose counter exceeds a threshold value, wherein first category transformation rules are determined from the first category tests whose counters do not exceed the threshold values for the first category tests.

9. The method of claim 8, wherein the first category tests are members of a set of tests to test equality between a source and target; test if the value of a source column contains the value of a target column; test if the value of a target column contains the value of a target column; and test if the value of a target column is equal to a result of a scalar function applied on one or more source columns.

10. The method of claim 1, wherein the second pre-processing method, comprises:
joining the rows of the source and target tables to produce a joined table having the at last one unpredicted target column comprising at least one unpredicted target numerical column from the target table, wherein applying the second pre-processing method comprises performing at least one function on rows in each column of the source table grouped by a key to produce at least one result column;
applying functions to the source table columns to produce result columns; and
determining whether each result column for the key matches one of at least one unpredicted target numerical column value for the key, wherein the second category pre-processing output comprises information on result columns from the source table columns that match the at least one unpredicted target numerical column.

11. The method of claim 10, wherein the functions applied to the source table columns are a member of a set of aggregation functions comprising summing, minimum, maximum, average, variance, and standard deviation.

12. The method of claim 10, wherein the second category pre-processing output indicates a minimum specified percentage of time the result columns match the at least one unpredicted target numerical column.

13. The method of claim 10, wherein the second pre-processing method is performed in response to determining that there is at least one unpredicted numerical target column and there is one row in the target table corresponding to a plurality of rows in the source table.

14. The method of claim 10, wherein the second pre-processing method comprises joining the rows of the source and target tables to produce a joined table having the at least one unpredicted target numerical column from the target table, further comprising:
  performing a regression analysis on numerical source columns to determine a regression equation predicting one of the at least one unpredicted target numerical column, wherein regression analysis output indicates regression equations and their confidence levels.

15. The method of claim 1, further comprising:
  presenting the determined first and second category transformation rules for user review; and
  storing the determined first and second category transformation rules in a repository.

16. A system, comprising:
  a computer readable storage media including a source table comprising a plurality of rows and a target table resulting from a transformation applied to the rows of the source table;
  an analysis engine executed to perform operations, the operations comprising:
    selecting the source table in the computer readable storage media;
    applying a first pre-processing method with respect to columns in the source and target tables to produce first category pre-processing output;
    using the first category pre-processing output to determine first category transformation rules with respect to at least one source table column and at least one target table column to predict values in the target table from values in the source table;
    determining at least one unpredicted target column in the target table comprising at least one target column determined not to be predicted by the first category transformation rules;
    for the at least one unpredicted target column, applying a second pre-processing method to the at least one unpredicted target column and the columns in the source table to produce second category pre-processing output; and
    using the second category pre-processing output to determine second category transformation rules with respect to the at least one unpredicted target column in the target table.

17. The system of claim 16, wherein the operations further comprise:
  for the at least one unpredicted target column in the target table not predicted by any determined first and second category transformation rules, applying a third processing method to columns in the source table and the at least one unpredicted target column to produce third category pre-processing output; and
  using the third category pre-processing output to determine third category transformation rules with respect to at least one source table column and the at least one unpredicted target column in the target table.

18. The system of claim 16, wherein applying the first pre-processing method comprises applying first category tests to the source and target table columns to produce the first category pre-processing output, wherein the first category pre-processing output comprises first category test output.

19. The system of claim 18, wherein the applying of the first pre-processing method comprises:
  joining the rows of the source and target tables to produce a joined table, wherein each row of the joined table includes the columns of the source and target tables;
  for rows of the joined table, outputting one row for columns in the joined table having an identifier of the row of the joined table and a name and value of the column in the joined table;
  performing the first category tests on the rows in the joined table; and
  for instances where one of the output rows passes one of the first category tests, generating one test output row identifying the row identifier for which a first category test passed and information identifying the passed first category test.

20. The system of claim 16, wherein the second pre-processing method, comprises:
  joining the rows of the source and target tables to produce a joined table having the at least one unpredicted target column comprising at least one unpredicted target numerical column from the target table, wherein applying the second pre-processing method comprises performing at least one function on rows in each column of the source table grouped by a key to produce at least one result column;
  applying functions to the source table columns to produce result columns; and
  determining whether each result column for the key matches one of at least one unpredicted target numerical column value for the key, wherein the second category pre-processing output comprises information on result columns from the source table columns that match the at least one unpredicted target numerical column.

21. An article of manufacture comprising a non-transitory computer readable storage medium including code, wherein the code is executed to perform operations, the operations comprising:
  selecting a source table comprising a plurality of rows and a target table resulting from a transformation applied to the rows of the source table;
  applying a first pre-processing method with respect to columns in the source and target tables to produce first category pre-processing output;
  using the first category pre-processing output to determine first category transformation rules with respect to at least one source table column and at least one target table column to predict values in the target table from values in the source table;
  determining at least one unpredicted target column in the target table comprising at least one target column determined not to be predicted by the first category transformation rules;
  for the at least one unpredicted target column, applying a second pre-processing method to the at least one unpredicted target column and the columns in the source table to produce second category pre-processing output; and
  using the second category pre-processing output to determine second category transformation rules with respect to the at least one unpredicted target column in the target table.

22. The article of manufacture of claim 21, wherein the operations further comprise:
  for the at least one unpredicted target column in the target table not predicted by any determined first and second category transformation rules, applying a third processing method to columns in the source table and the at least one unpredicted target column to produce third category pre-processing output; and using the third category pre-processing output to determine third category transformation rules with respect to at least one source table column and the at least one unpredicted target column in the target table.

23. The article of manufacture of claim 21, wherein applying the first pre-processing method comprises applying first category tests to the source and target table columns to produce the first category pre-processing output, wherein the first category pre-processing output comprises first category test output.

24. The article of manufacture of claim 23, wherein the applying of the first pre-processing method comprises:
    joining the rows of the source and target tables to produce a joined table, wherein each row of the joined table includes the columns of the source and target tables;
    for rows of the joined table, outputting one row for columns in the joined table having an identifier of the row of the joined table and a name and value of the column in the joined table;
    performing the first category tests on the rows in the joined table; and
    for instances where one of the output rows passes one of the first category tests, generating one test output row identifying the row identifier for which a first category test passed and information identifying the passed first category test.

25. The article of manufacture of claim 21, wherein the second pre-processing method, comprises:
    joining the rows of the source and target tables to produce a joined table having the at last one unpredicted target column comprising at least one unpredicted target numerical column from the target table, wherein applying the second pre-processing method comprises performing at least one function on rows in each column of the source table grouped by a key to produce at least one result column;
    applying functions to the source table columns to produce result columns; and
    determining whether each result column for the key matches one of at least one unpredicted target numerical column value for the key, wherein the second category pre-processing output comprises information on result columns from the source table columns that match the at least one unpredicted target numerical column.

26. The method of claim 1, wherein the first category pre-processing output indicates a relatedness of the values in the source and target tables, wherein the second pre-processing method includes aggregate operations on the rows in the source table to produce aggregate source columns, and wherein the second category pre-processing output indicates whether target columns match the aggregate source columns.

27. The system of claim 16, wherein the first category pre-processing output indicates a relatedness of the values in the source and target tables, wherein the second pre-processing method includes aggregate operations on the rows in the source table to produce aggregate source columns, and wherein the second category pre-processing output indicates whether target columns match the aggregate source columns.

28. The article of manufacture of claim 21, wherein the first category pre-processing output indicates a relatedness of the values in the source and target tables, wherein the second pre-processing method includes aggregate operations on the rows in the source table to produce aggregate source columns, and wherein the second category pre-processing output indicates whether target columns match the aggregate source columns.

* * * * *